US012612543B2

(12) United States Patent
Gowida et al.

(10) Patent No.: US 12,612,543 B2
(45) Date of Patent: Apr. 28, 2026

(54) GEMINI SURFACTANT AS FOAMING AGENT FOR FOAM DRILLING

(71) Applicant: KING FAHD UNIVERSITY OF PETROLEUM AND MINERALS, Dhahran (SA)

(72) Inventors: Ahmed Hamdy Gowida, Dhahran (SA); Salaheldin Mahmoud Ahmed Elkatatny, Dhahran (SA); Muhammad Shahzad Kamal, Dhahran (SA); Sayed Muhammad Shakil Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/956,286

(22) Filed: Nov. 22, 2024

(65) Prior Publication Data

US 2025/0354048 A1 Nov. 20, 2025

Related U.S. Application Data

(60) Provisional application No. 63/647,847, filed on May 15, 2024.

(51) Int. Cl.
*E21B 43/27* (2006.01)
*C09K 8/24* (2006.01)
*C09K 8/38* (2006.01)

(52) U.S. Cl.
CPC .................. *C09K 8/38* (2013.01); *C09K 8/24* (2013.01); *E21B 43/27* (2020.05)

(58) Field of Classification Search
CPC .............. C09K 8/38; C09K 8/24; E21B 43/27
See application file for complete search history.

(56) References Cited

U.S. PATENT DOCUMENTS

| | | | | |
|---|---|---|---|---|
| 6,710,022 | B1 | 3/2004 | Kwetkat et al. | |
| 11,981,856 | B1 * | 5/2024 | Saleh | C09K 8/206 |
| 2005/0137114 | A1 * | 6/2005 | Gatlin | C09K 8/703 510/424 |
| 2010/0172875 | A1 | 7/2010 | Phan et al. | |
| 2020/0325381 | A1 * | 10/2020 | Kamal | C09K 8/24 |
| 2021/0238472 | A1 * | 8/2021 | Kamal | C09K 8/602 |
| 2021/0404288 | A1 * | 12/2021 | Tarabbia | C09K 8/44 |

FOREIGN PATENT DOCUMENTS

| | | |
|---|---|---|
| CN | 111978935 B | 10/2022 |
| CN | 111440085 B | 8/2023 |
| EP | 2 325 278 B1 | 9/2015 |

OTHER PUBLICATIONS

Junwen Wu, et al., "Foaming Agent Developed for Gas Wells with Liquid Loading Problem Using New Surfactant and Nanotechnology", SPE Journal, vol. 25, No. 6, Dec. 17, 2020, pp. 3138-3144, 7 pages.

Mobeen Murtaza, et al., "Evaluation of Clay Hydration and Swelling Inhibition Using Quaternary Ammonium Dicationic. Surfactant with Phenyl Linker", Molecules 2020, vol. 25, No. 18, 4333, Sep. 22, 2020, 20 pages.

* cited by examiner

*Primary Examiner* — Silvana C Runyan
(74) *Attorney, Agent, or Firm* — Oblon, McClelland, Maier & Neustadt, L.L.P.

(57) ABSTRACT

A method of underbalanced drilling includes drilling into a subterranean geological formation to form a wellbore and injecting a foaming agent into the wellbore during drilling at a wellbore pressure that is below a pore pressure of the subterranean geological formation. The foaming agent forms a foam in the wellbore at a drilling surface at a bottom of the wellbore and transports drill cuttings formed by the drilling away from the drilling surface in the foam. The foaming agent is an aqueous solution including a gemini amphiphile dicationic surfactant having a linker and a lipophilic tail.

11 Claims, 19 Drawing Sheets

GEMINI SURFACTANT AS FOAMING AGENT FOR FOAM DRILLING

BACKGROUND

Technical Field

The present disclosure is directed to an underbalanced drilling process and, more particularly, towards a method of underbalanced drilling using a foaming agent of an aqueous solution comprising a gemini surfactant.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Underbalanced foam drilling (UBD) is a drilling technique used to drill oil and gas wells where the pressure in the wellbore is kept lower than the static pressure of the formation being drilled. As the well is being drilled, formation fluid flows into the wellbore and up to the surface. Conventional or "overbalanced" drilling is a drilling technique that uses a denser drilling fluid than the formation fluid to maintain a higher pressure in the wellbore than the formation pressure. UBD provides significant advantages over conventional drilling methods. In a conventional well, drilling mud is forced into the formation in a process called invasion, which frequently causes formation damage, however, in UBD, if the under-balanced state is maintained until the well becomes productive, invasion does not occur and formation damage can be completely avoided. Further, in UBD, the decreased pressure at the bottom of the well-bore makes it easier for the drill bit to cut and remove rock, increasing the rate of penetration (ROP). In conventional drilling methods, when drilling mud flows into the formation uncontrollably, lost circulation occurs. Large amounts of mud can be lost before a proper mud cake forms, or the loss can continue indefinitely. If the well is drilled underbalanced, mud will not enter the formation and lost circulation can be avoided.

There are several UBD techniques including, but not limited to, dry air, mist, foam, airlift, and aerated mud drilling. Dry air drilling is also known as dusting. In dry air drilling, air compressors combined with a booster (which takes the head from the compressors and increases the pressure of the air, but does not increase the volume of air going down hole) are used and the only fluid injected into the well is a small amount of oil to reduce corrosion. Dry air drilling, however, is considered an old UBD technique which may cause difficulties with effective hole cleaning. In mist drilling, a small amount of foaming agent (soap) is added into the flow of air. Fine particles of water and foam in an atmosphere of air bring cuttings back to the surface. Mist drilling can reduce the risk of downhole fires and allows for minor influx of formation fluids into the well. Mist drilling can, however, lead to slugging and increased pressure if the incorrect gas to liquid ratio is utilized. In aerated mud drilling, compressed air is added to the drilling fluid (mud or water). Aerated drilling fluid has a lower density than conventional drilling fluids, thus the hydrostatic pressure inside the well can be lower than the formation pressure. Finally, in foam drilling, a larger amount of foaming agent, as compared to mist drilling, is added to the flow to create a foam in the wellbore. A desired foam has a low density and high viscosity to help transport cuttings to the surface, improving hole cleaning. In addition to increased efficiency, the foam can help reduce the risk of pore blocking, phase trapping, and clay reaction thus leading to reduced formation damage. Further, the foam can reduce the risk of wellbore collapse by reducing the influx of formation fluids, thus improving borehold stability. Maintaining foam stability in demanding conditions, such as high water salinity or alkaline environments, can be a challenge to foam drilling.

A drilling foam may be a composition of a gas, a liquid, and a foaming agent, the foaming agent typically being a surfactant. A drilling foam may be a dispersion of gas in a continuous liquid phase, held together by the surfactant. The gas phase in a drilling foam may comprise nitrogen, air, carbon dioxide, or natural gas, while the liquid phase can be either water for aqueous-based foams or diesel/hydrocarbon oil for non-aqueous drilling foam systems.

Drilling foams may be classified as either a wet or a dry drilling foam. Wet drilling foams have high liquid content and weak structure. Dry drilling foams have increased stability due to their rigid liquid film structure and lower drainage volume, leading to a transition from a spherical foam shape to a polyhedral shape. Foam generation may occur by three mechanisms, including particle absorption, stratification of nonadsorbing particles, and variations in capillary pressure due to adsorbed particles. Drilling foam systems further have good inherent viscosity and fluid-loss control properties, thus allowing them to aid in preventing fluid loss, minimizing formation damage, and ensuring reliable hole cleaning.

The stability of drilling foams may be limited in three ways, causing foam decay over time. These three ways are liquid drainage, coarsening, and bubble coalescence. Liquid drainage is the flow of liquid relative to the gas bubbles. Liquid drainage of a drilling foam is accelerated by gravity and/or capillary forces and is resisted by viscous forces. As the foam drains, the amount of liquid inside the film between bubbles changes. Liquid drainage is a significant contributor to foam decay, as it reduces the liquid content of the foam, which governs the thickness of the lamella film (a thin liquid layer that separates gas bubbles in the foam). The presence of a thicker lamella film between the foam bubbles allows for greater liquid retention. Additionally, the thicker lamella allows for greater liquid retention, contributing to the rounded appearance of the bubbles and the prolonged maintenance of this shape which leads to a more stable foam. Coalescence is a process in drilling foams where small drops of liquid merge together to form larger drops. This can happen when the emulsion film around the droplets weakens, which can lead to the breakdown of the emulsion and subsequent destabilization of the foam. Bubble coarsening, or Ostwald ripening, is a process that occurs in foams when larger bubbles grow at the expense of smaller bubbles. In drilling foams, bubble coarsening can affect the foam's structure and decrease its ability to reduce gas diffusion between the bubbles, leading to destabilization of the foam.

Additional factors that may also influence the stability of a drilling foam include foam quality, surfactant concentration, pH, temperature, liquid salinity, the presence of polymers, foam generation method, surface tension, and gas type. Surfactants added to the base liquid of a drilling foam are important in producing more stable drilling foams, as they decrease interfacial tension and form stable liquid film structures, leading to a more consistent foam structure that improves the stability of the drilling foam. Surfactants may adhere to the gas-liquid interface to increase the stability of drilling foams. The surfactant particles are adsorbed to the surface of the bubbles, the plateau border (point of connection among three approaching bubble), and the lamella between bubbles. The adsorbed particles at the plateau border form a dense film surrounding the bubbles to improve stability by reducing coalescence during drainage.

Foam stability may be measured by the foam's volume or height changes over time after foam generation begins. Specifically, drilling foam stability can be described in terms of the foam half-life ($H_0$), and the drainage half-life time (t FLS 50%). The foam half-life ($H_0$) indicates the duration where the foam volume is reduced to 50% of its initial value due to foam decay. The foam half-life can be determined by calculating the foam volume stability (FVS), which is the percentage of foam volume that remains compared to the maximum foam volume after foaming has ceased. Foam liquid stability (FLS) assesses the stability of the drilling foam and its drainage properties. FLS indicates the drilling foam's capability to retain liquid and determines the level of dryness of the drilling foam. The 50% drainage half-life time (t FLS 50%) denotes the point at which FLS reduces to half of its original value.

For UBD applications, research on several drilling-foam systems have been conducted with various types of additives, such as stabilizers, polymers, and surfactants. Frequently tested surfactants include commercial products, anionic surfactants (e.g., sodium dodecyl sulfate), cationic surfactants (e.g., cetyltrimethylammonium bromide) and amphoteric surfactants (e.g., n-alkyl betaines). Similarly, stabilizers have been researched, including xanthan gum, hydroxyl-ethylcellulose (HEC), carboxymethyl cellulose (CMC), guar gum, dris pac, and partially hydrolyzed polyacrylamide (PHPA). Multiple research studies have also been conducted to understand how drilling foam stability is affected by various factors such as foam quality, testing conditions of pressure and temperature, and monovalent or divalent salt ions. However, these research studies failed to study the effectiveness of the tested drilling foams when operating under demanding environments such as high pH conditions and in environments with increased salinity, both of which are important for preventing corrosion during UBD operations. Therefore, further research on drilling foam performance under demanding conditions is still needed.

Accordingly, one object of the present disclosure is to develop a surfactant within a high pH (mildly alkaline pH range of 9.5 to 10.5) and an environment with increased salinity within a wellbore, maintaining stability in harsh drilling environments while being compatible with water-sensitive formations.

SUMMARY

In one embodiment, a method of underbalanced drilling is described. The method comprises drilling into a subterranean geological formation to form a wellbore. The method further comprises injecting a foaming agent into the wellbore during drilling at a wellbore pressure that is below a pore pressure of the subterranean geological formation. The foaming agent forms a foam in the wellbore at a drilling surface at a bottom of the wellbore. The method further comprises transporting drill cuttings, formed by the drilling, away from the drilling surface in the foam. The foaming agent is an aqueous solution comprising a gemini amphiphile dicationic surfactant having a linker and a lipophilic tail of a Formula I

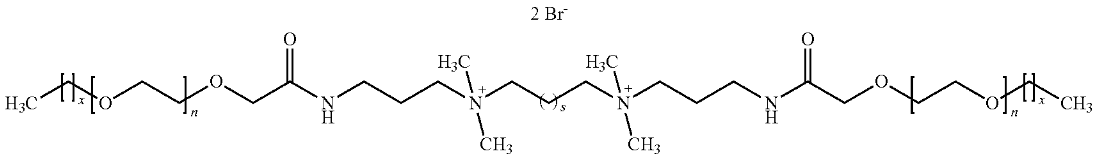

(I), in which, s represents the linker having 8 to 12 carbons, x represents the lipophilic tail having 8 to 12 carbons, and n represents a nonzero integer.

In some embodiments, the foaming agent has a pH of 8 to 11.

In some embodiments, the foaming agent is an aqueous solution that further comprises a polymer selected from the group consisting of xanthan gum, guar gum, starch, and polyanionic cellulose.

In some embodiments, the linker has 12 carbon atoms.

In some embodiments, the foaming agent has a foam half-life of at least 9 min.

In some embodiments, the lipophilic tail has 12 carbon atoms.

In some embodiments, the foaming agent has a pH of 9 to 10.

In some embodiments, the gemini amphiphile is present in the foaming agent in an amount of 0.1 to 2 wt. %.

In some embodiments, the gemini amphiphile is present in the foaming agent in an amount of 0.5 wt. %.

In some embodiments, the foaming agent is an aqueous solution that further comprises at least one selected from the group consisting of deionized water, synthetic seawater, and formation water.

In some embodiments, the foaming agent is an aqueous solution that further comprises formation water.

In some embodiments, the foaming agent has a pH of 9.5.

In some embodiments, the foaming agent is an aqueous solution that further comprises deionized water and synthetic seawater. A ratio of an amount of the deionized water and an amount of the synthetic seawater is 1:4 to 4:1.

In some embodiments, the foaming agent has a drainage half-life ($t_{FLS50\%}$) of at least 91 min.

In some embodiments, the foaming agent has an initial foam volume ($V_{initial}$) of at least 212 mL.

In some embodiments, the foaming agent has an initial bubble count of at least 71 per $mm^2$.

In some embodiments, the foaming agent has an average initial bubble radius of at least 56 μm.

In some embodiments, the foaming agent has an average bubble area of at least 500,000 $\mu m^2$ after 2 hr.

In some embodiments, the foaming agent is an aqueous solution that further comprises polyanionic cellulose.

In some embodiments, the foaming agent has a spherical foam structure.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
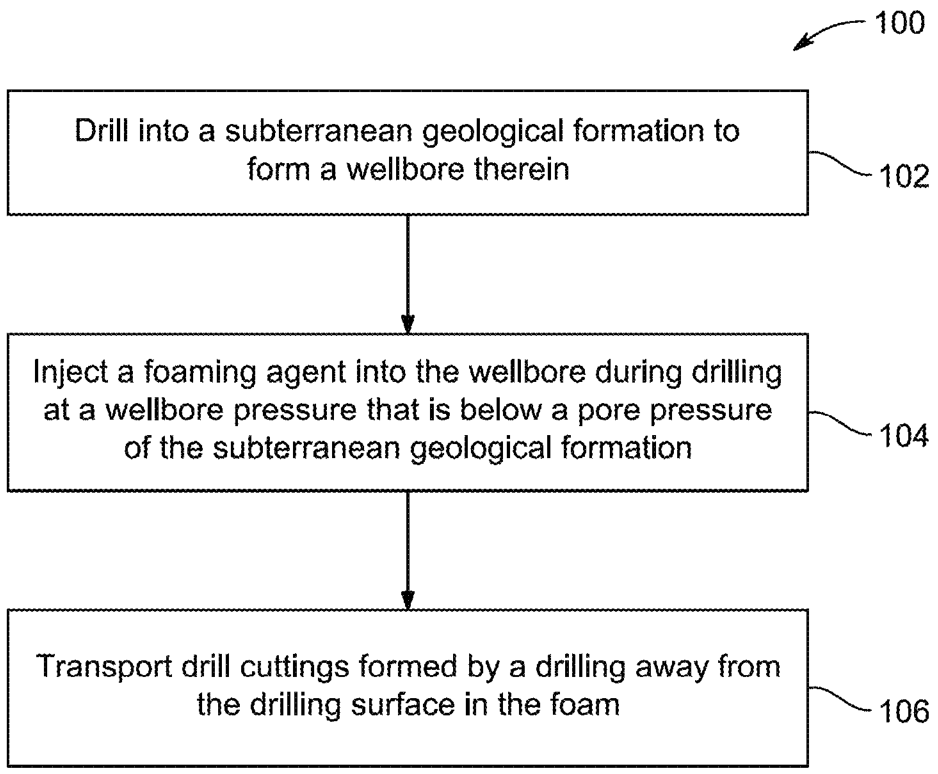
FIG. 1 is a schematic flow chart of a method of underbalanced drilling, according to certain embodiments.

In the drawings, like reference numerals designate identical or corresponding parts throughout the several views. Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values).

When referencing drilling fluid compositions, the phrase "substantially free", unless otherwise specified, describes an amount of a particular component present in the drilling fluid being less than about 1 wt. %, preferably less than about 0.5 wt. %, more preferably less than about 0.1 wt. %, even more preferably less than about 0.05 wt. %, yet even more preferably 0 wt. %, relative to a total weight of the drilling fluid.

As used herein, the terms "compound", "surfactant", and "product" are used interchangeably, and are intended to refer to a chemical entity, whether in the solid, liquid or gaseous phase, and whether in a crude mixture or purified and isolated.

As used herein, the term "solvate" refers to a physical association of a compound of this disclosure with one or more solvent molecules, whether organic or inorganic. This physical association may comprise hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those of ordinary skill in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular Formula and sequence of bonded atoms (i.e. constitution) but differ in the three-dimensional orientations of their atoms in space. This contrasts with structural isomers, which share the same molecular Formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso-compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural Formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the ring systems, stereogenic centers, and the like can all be present in the compounds, and all such stable isomers are contemplated in the present disclosure. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are part of the present disclosure. When stereoisomeric products are prepared, they may be separated by conventional methods, for example, by chromatography, fractional crystallization, or use of a chiral agent.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanoylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. $SO_2NH_2$), substituted sulfonamide, nitro, cyano, carboxy, unsubstituted amide (i.e. $CONH_2$), substituted amide (e.g. CONHalkyl, CONHaryl, CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof. The substituents may themselves be optionally substituted, and may be either unprotected, or protected as necessary, as known to those of ordinary skill in the art.

As used herein, the term "alkyl" unless otherwise specified refers to both branched and straight-chain saturated aliphatic primary, secondary, and/or tertiary hydrocarbons having a specified number of carbon atoms. For example, "$C_1$ to $C_6$ alkyl" or "$C_{1-6}$ alkyl" (or alkylene) denotes alkyl chain having 1 to 6 carbon atoms. The alkyl or alkylene groups typically include $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, and specifically includes, but is not limited to, methyl, trifluoromethyl, ethyl, n-propyl, isopropyl, n-butyl, isobutyl, t-butyl, n-pentyl, isopentyl, neopentyl, n-hexyl, isohexyl, 3-methylpentyl, 2,2-dimethylbutyl, 2,3-dimethylbutyl, 2-ethylhexyl, n-heptyl, n-octyl, n-nonyl, 3,7-dimethyloctyl, n-decyl, n-undecyl, n-dodecyl, n-tridecyl, and 2-propylheptyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "aryl", as used herein, and unless otherwise specified, refers to a substituent that is derived from an aromatic hydrocarbon (arene) that has had a hydrogen atom removed from a ring carbon atom. Aryl includes phenyl, biphenyl, naphthyl, anthracenyl, and the like.

The term "halide", as used herein, means fluoride, chloride, bromide, and iodide.

The term "halogen", as used herein, means fluoro-, chloro-, bromo-, and iodo-.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{14}N$ and $^{15}N$, and isotopes of oxygen include $^{16}O$, $^{17}O$ and $^{18}O$. Isotopically labeled compounds of the disclosure can generally be prepared by conventional techniques known to those of ordinary skill in the art or by processes and methods analogous to those described herein, using an appropriate isotopically labeled reagent in place of the non-labeled reagent otherwise employed.

As used here, the term "underbalanced drilling" (UBD) refers to a method of drilling in which the hydrostatic pressure of the drilling fluid is intentionally kept lower than the formation pore pressure. It is often implemented as a technique for minimizing drilling-induced formation damage, increasing well productivity, preventing loss of circulation, and improving drilling performance. UBD technology may benefit many different scenarios including, but not limited to, naturally fractured formations, depleted reservoirs, hard formations, high permeability vuggy carbonates, and high permeability unconsolidated or consolidated sands.

As used here, term "foamability of a surfactant" refers to the surfactant's ability to generate foam regardless of its properties. It can be described by the initial foam volume ($V_{initial}$) generated once the gas injection through the porous plate has stopped.

As used here, term "foam half-life ($H_0$)" indicates the duration where the foam volume is reduced to 50% of its initial value due to foam decay. The foam half-life can be determined by calculating the foam volume stability (FVS), which is the percentage of foam volume that remains compared to the maximum foam volume after foaming has ceased. FVS can be calculated using the following equation:

$$FVS(t) = \frac{V_t(\text{foam})}{V_{Initial}(\text{foam})} \times 100$$

where V is the foam volume observed in the cylindrical glass column, the subscript t refers to the measured foam volume at a certain time, and $V_{Initial}$ stands for the initial foam volume immediately after the bubbling has stopped. Afterward, $H_0$ can be estimated by monitoring the FVS values over time and how long it would take the foam volume to be reduced by 50% of its initial value.

As used here, term "foam liquid stability" (FLS) is another property of a drilling foam that must be considered to assess the stability of foam and its drainage properties. FLS indicates the foam's capability to retain liquid and determines the level of dryness of the foam. The 50% drainage half-life time ($t_{FLS\ 50\%}$) denotes the point at which FLS reduces to half of its original value. The calculation for FLS can be determined using the following equation.

$$FLS(t) = \frac{V_{i(liquid)} - V_{t(liquid)}}{V_{i(liquid)} - V_{f(liquid)}} \times 100\%$$

where, $V_{i(liquid)}$ denotes the initial volume of the liquid before gas bubbling takes place. After bubbling, the volume of the liquid, $Vt_{(liquid)}$, undergoes changes over a specified duration, t. The subscript "f" refers to the final condition (after foaming has stopped or at the end of the bubbling process). The disparity between these values signifies the amount of liquid that gets trapped inside the foam structure.

As used here, term "drainage half-life time ($t_{FLS\ 50\%}$)" marks the time it takes 50% of the liquid to drain out of the foam structure. Thus, the foam system has better stability when the $t_{FLS50\%}$ value is higher, indicating that the foam can hold more liquid within the lamella film, minimizing liquid drainage out of the foam.

In one embodiment of the present disclosure, a foaming agent is described. The foaming agent comprises an aqueous solution, comprising a gemini amphiphile dicationic surfactant of Formula I. The surfactant has a linker (s) and a lipophilic tail (x).

Formula (I)

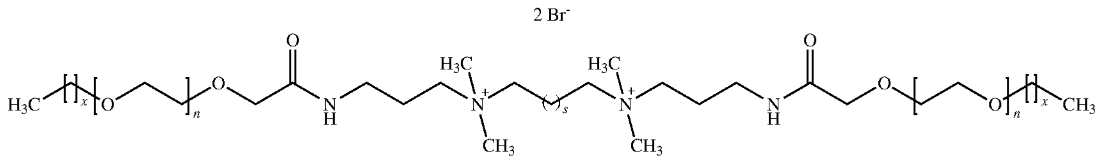

or a solvate thereof, a tautomer thereof, a stereoisomer thereof, or a mixture thereof.

As used herein, s represents the linker having 8 to 12 carbons, preferably 8, preferably 9, preferably 10, preferably 11, and preferably 12 carbons. In a most preferred embodiment, 's' is the linker having 12 carbon atoms. In some embodiments, the linker may be optionally substituted with an alkyl, aryl, a heteroaryl, a heteroaryl, or a halo group.

As used herein, the value of x denotes an alkyl chain of $—CH_2—$ groups connected to the $—CH_3$ end group of the surfactant of Formula (I). In one or more embodiments, each of x is an integer in a range of 5 to 21. Most preferably, x is an integer in a range of 11 to 13, such as 11, 12, or 13. In a more preferred embodiment, x represents the lipophilic tail having 8 to 12 carbons, such as 8, 9, 10, 11, or 12.

As used herein, the value of n denotes the degree of ethoxylation ($—O(CH_2)_2—$) of the surfactant of Formula (I). In one or more embodiments, each n is an integer in a range of 1 to 15, preferably 2 to 14, preferably 3 to 13, preferably 4 to 12, preferably 5 to 11, preferably 6 to 10, preferably 7 to 9. In a preferred embodiment, each of n is an integer in a range of 2 to 11, 3 to 10, 4 to 9, 5 to 7, or 6 to 8. Most preferably, each of n ranges from 6 to 11, 7 to 10, or 8 to 9. It is equally envisaged that the surfactant disclosed herein may have values for each of x, y, and/or n that fall outside of the aforementioned preferred ranges and still provide suitable surfactants of Formula (I).

It may be observed from the compound of Formula (I) that the anion is a bromide. However, other anions such as fluoride, chloride, iodide, nitrate, sulfate, phosphate, methanesulfonate, ethanesulfonate, p-toluenesulfonate, salicylate, malate, maleate, succinate, tartrate, citrate, acetate, perchlorate, trifluoromethanesulfonate, acetylacetonate, tetrafluoroborate, hexafluorophosphate, and hexafluoroacetylacetonate, may be used as well. In one embodiment, an anion of Formula (I) is selected from a halide ion, a hexafluorophosphate ion, a trifluoromethanesulfonate ion, and a tetrafluoroborate ion.

In one embodiment, the gemini amphiphile of the present disclosure has a number average molecular weight (Mn) of 650 to 6,000 g/mol, preferably 700 to 5,000 g/mol, preferably 750 to 4,000 g/mol, preferably 800 to 3,500 g/mol, preferably 900 to 3,000 g/mol, preferably 1,000 to 2,750 g/mol, preferably 1,200 to 2,500 g/mol, preferably 1,500 to 2,000 g/mol. However, in certain embodiments, the surfactant has an average molecular weight that is greater than 6,000 g/mol.

The surfactant of Formula (I) may be prepared by mixing a carboxylic acid of Formula (II)

Formula (II)

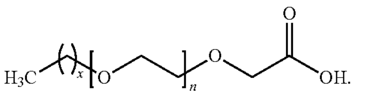

or a salt thereof, a solvate thereof, or a mixture thereof with an amine of Formula (III)

Formula (III)

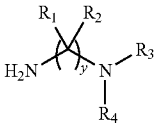

or a salt thereof, a solvate thereof, a stereoisomer thereof, or a mixture thereof in the presence of a fluoride salt to form a mixture, heating the mixture to obtain an amidoamine intermediate, and reacting the amidoamine intermediate with a disubstituted hydrocarbon linker of Formula (IV)

Formula (IV)

or a solvate thereof, a stereoisomer thereof, or a mixture thereof in a solvent, thereby forming the surfactant, wherein $R_1$ and $R_2$ are independently selected from the group consisting of a hydrogen, an optionally substituted alkyl, an optionally substituted cycloalkyl, and an optionally substituted arylalkyl, $R_3$ and $R_4$ are independently selected from the group consisting of an optionally substituted alkyl, an optionally substituted cycloalkyl, and an optionally substituted arylalkyl, L is a $C_{2-12}$ alkane or a $C_{2-12}$ alkenylene or a $C_{2-12}$ alkynylene, x is an integer in a range of 5 to 21, y is an integer in a range of 1 to 5, n is an integer in a range of 1 to 15, and Y is a halogen.

In one or more embodiments, x of the carboxylic acid of Formula (II) is x is an integer in a range of 5 to 21. Most preferably, x is an integer in a range of 11 to 13, such as 11, 12, or 13. In a preferred embodiment, n is an integer in a range of 1 to 10, preferably 1 to 5, such as 1, 2, 3, 4, or 5.

Exemplary carboxylic acids that may be used herein include, but are not limited to, glycolic acid ethoxylate lauryl ether, glycolic acid ethoxylate hexyl ether, glycolic acid ethoxylate heptyl ether, glycolic acid ethoxylate octyl ether, glycolic acid ethoxylate nonyl ether, glycolic acid ethoxylate decyl ether, glycolic acid ethoxylate tetradecyl ether, glycolic acid ethoxylate hexadecyl ether, glycolic acid ethoxylate stearyl ether, glycolic acid ethoxylate nonadecyl ether, glycolic acid ethoxylate eicosyl ether, and glycolic acid ethoxylate heneicosyl ether. In a preferred embodiment, the carboxylic acid is glycolic acid ethoxylate lauryl ether.

In one or more embodiments, the carboxylic acid of Formula (II) has a number average molecular weight of 250 to 900 g/mol, preferably 300 to 850 g/mol, preferably 350 to 800 g/mol, preferably 400 to 750 g/mol, preferably 450 to 700 g/mol, preferably 500 to 650 g/mol, preferably 550 to 600 g/mol. In one embodiment, the carboxylic acid is glycolic acid ethoxylate lauryl ether with a number average molecular weight of about 360 g/mol.

In one or more embodiments, $R_1$ and $R_2$ of the amine of Formula (III) are independently selected from the group consisting of a hydrogen and a methyl. In a preferred embodiment, $R_1$ and $R_2$ are a hydrogen. In a related embodiment, $R_3$ and $R_4$ of the amine of Formula (VI) are independently selected from the methyl, ethyl, and isopropyl group. In a preferred embodiment, $R_3$ and $R_4$ are a methyl. In another related embodiment, y of the amine of Formula (III) is an integer in a range of 1 to 5. In a preferred embodiment, the amine of Formula of (III) is 3-(dimethylamino)-1-propylamine. Other amines that may be used in addition to or in lieu of 3-(dimethylamino)-1-propylamine include, but are not limited to, 2-(dimethylamino)ethylamine, 2-(diethylamino)ethylamine, 1-dimethylamino-2-propylamine, 3-(diethylamino)propylamine, (3-amino-2-methylpropyl)dimethylamine, (3-amino-1-methylpropyl)dimethylamine, N,N,2,2-tetramethyl-1,3-propanediamine, 4-(dimethylamino)butylamine, 5-(dimethylamino)amylamine, 5-(diethylamino)pentylamine, and 5-(diisopropylamino)amylamine.

In a preferred embodiment, reacting the mixture comprising the carboxylic acid of Formula (II) with the amine of Formula (III) is conducted in neat (solvent-free) conditions. It is equally envisaged that the reaction may be adapted to be performed in a solvent such as benzene, xylene, dimethylformamide, tetrahydrofuran, ethyl acetate, diethyl ether, acetonitrile, dimethyl sulfoxide, methylene chloride, chloroform, nitrobenzene, isopropanol, and mixtures thereof.

In a preferred embodiment, a molar ratio of the amine of Formula (III) to the carboxylic acid of Formula (II) is in a range of 1:1 to 5:1, preferably 1:2 to 1:4, or about 2:7. In some embodiments, the amine is introduced to the mixture in a two-stage or multi-stage fashion. For example, a first portion of the amine which is 50 to 70%, 55 to 65%, or about 57% of a total mole of the amine used herein may be added to the mixture and allowed to react with the carboxylic acid for 3 to 9 hours, 4 to 8 hours, 5 to 7 hours, or about 6 hours, and subsequently a second portion of the amine which is 30 to 50%, 35 to 45%, or about 43% of a total mol of the amine used herein may be added to the same mixture and allowed to react with the carboxylic acid for 2 to 8 hours, 3 to 7 hours, 4 to 6 hours, or about 5 hours. Alternatively, the amine may be introduced to the mixture in one batch and allowed to react with the carboxylic acid for 5 to 20 hours, 6 to 19 hours, 7 to 18 hours, 8 to 17 hours, 9 to 16 hours, 10 to 15 hours, 11 to 14 hours, 12 to 13 hours, or about 12 hours.

In one or more embodiments, the mixture is heated at a temperature of 50 to 200° C. under agitation, preferably 60 to 190° C., preferably 70 to 180° C., preferably 80 to 170° C., preferably 90 to 160° C., preferably 100 to 160° C., preferably 110 to 160° C., preferably 120 to 160° C., preferably 130 to 160° C., preferably 140 to 160° C., most preferably 150 to 160° C. under agitation. An external heat source, such as an oil bath, an oven, microwave, or a heating mantle, may be employed to heat the mixture. The mixture may be agitated throughout the duration of the reaction by employing a rotary shaker, a magnetic stirrer, or an overhead stirrer. In another embodiment, the mixture is left to stand (i.e. not agitated). In one embodiment, the mixture is sonicated in an ultrasonic bath or with an ultrasonic probe. The amidation reaction may be conducted in inert gas (e.g. nitrogen, argon, helium). In some embodiments, the reaction may not be conducted in inert gas, but in a vacuum. In a preferred embodiment, the intermediate is collected as an oil that may be separated and washed in acetone, ethyl acetate, and/or isopropanol and then dried. In one embodiment, the oil may be dried under a vacuum until a constant weight is achieved. In a preferred embodiment, the step forming the intermediate has a product yield of at least 75%, preferably at least 80%, preferably at least 90%, preferably at least 92%, preferably at least 94%, preferably at least 96%, preferably at least 97%.

In one or more embodiments, the mixture comprises a fluoride salt. The fluoride salt may be present as a catalyst to accelerate the amidation reaction. In a preferred embodiment, the fluoride salt used herein is at least one selected from sodium fluoride, potassium fluoride, silver fluoride, cesium fluoride, and tetrabutylammonium fluoride. In a most preferred embodiment, the fluoride salt is sodium fluoride. In one or more embodiments, a molar ratio of the fluoride salt to the carboxylic acid is in the range of 1:5 to 1:20, preferably 1:6 to 1:18, preferably 1:8 to 1:15, preferably 1:9 to 1:12, or about 1:10. Other amide bond formation reagents and catalysts that may be used in addition to or instead of the fluoride salt include, but are not limited to, carbodiimides such as 1-ethyl-3-(3-dimethylaminopropyl)carbodiimide (EDC), N,N'-dicyclohexylcarbodiimide (DCC), 1H-benzotriazole derivatives such as 1-[bis(dimethylamino)methylene]-1H-1,2,3-triazolo[4,5-b]pyridinium 3-oxid hexafluorophosphate (HATU), O-(benzotriazol-1-yl)-1,1,3,3-tetramethyluronium hexafluorophosphate (HBTU), 0-benzotriazol-1-yl-1,1,3,3-tetramethyluronium tetrafluoroborate (TBTU), as well as phosphoric acid, sulfuric acid, boric acid, silica gel, and zeolite.

In one or more embodiments, the mixture further comprises a molecular sieve. The molecular sieve may facilitate the removal of by-product (i.e., water) produced during the amidation reaction. Non-limiting exemplary molecular sieves applicable to the method disclosed herein include aluminosilicate minerals, porous glass, activated carbon, clay, and mesoporous silica. In a preferred embodiment, the molecular sieve comprises aluminum oxide ($Al_2O_3$). In a most preferred embodiment, the molecular sieve comprises microporous aluminum oxide having an average pore size of 0.2 to 0.5 nm, or 0.3 to 0.4 nm. Other drying agents that may be used in addition to or in lieu of the molecular sieve include, but are not limited to zeolites, anhydrous sodium sulfate, anhydrous magnesium sulfate, anhydrous calcium chloride, and anhydrous calcium sulfate. Conventional water-removing apparatus such as Dean-Stark trap may be utilized in addition to the aforementioned drying agents.

The method disclosed herein also involves reacting the amidoamine intermediate with the disubstituted hydrocarbon linker of Formula (IV), thereby producing the surfactant. In an embodiment, L is a $C_{2-12}$ alkane, preferably $C_{3-12}$ alkane, preferably $C_{4-12}$ alkane, preferably $C_{5-12}$ alkane, preferably $C_{6-12}$ alkane, preferably $C_{7-12}$ alkane, preferably $C_{8-12}$ alkane, most preferably a $C_{12}$ alkane, and Y is a halogen. In most preferred embodiments, the disubstituted hydrocarbon linker of Formula (IV) is 1,12-dibromo dodecane. Y is a halogen, preferably a chloro-, a bromo-, or an iodo-group. Preferably, the halogen is a bromo group.

In some embodiments, the foaming agent is an aqueous solution into which the gemini amphiphile is dispersed. The aqueous solution is at least one of deionized water, synthetic seawater, and formation water. In some embodiments, the foaming agent is an aqueous solution of water. In some embodiments, the foaming agent is an aqueous solution that comprises deionized water and synthetic seawater, and wherein a ratio of an amount of the deionized water and an amount of the synthetic seawater is 1:4 to 4:1, preferably 1:4 to 3:1, preferably 1:4 to 2:1, preferably 1:4 to 1:1, preferably 1:4 to 1:2, preferably 1:4 to 1:3. In some embodiments, the synthetic seawater comprises 5.5 to 6.5 g/L $Na_2SO_4$, 0.1 to 0.2 g/L $NaHCO_3$, 2 to 3 g/L $CaCl_2 \cdot 2H_2O$, 17 to 18 g/L $MgCl_2 \cdot 6H_2O$, and 41 to 42 g/L NaCl. In another embodiment, the synthetic seawater comprises 5.6 to 6.4 g/L $Na_2SO_4$, preferably 5.7 to 6.4 g/L, preferably 5.8 to 6.4 g/L, preferably 5.9 to 6.4 g/L, preferably 6.0 to 6.4 g/L, preferably 6.1 to 6.4 g/L, preferably 6.2 to 6.4 g/L, preferably 6.3 to 6.4 g/L, most preferably 6.34 g/L $Na_2SO_4$. In another embodiment, the synthetic seawater comprises 0.1 to 0.2 g/L $NaHCO_3$, preferably 0.11 to 0.19 g/L, preferably 0.12 to 0.18 g/L, preferably 0.13 to 0.17 g/L, preferably 0.14 to 0.17 g/L, preferably 0.15 to 0.17 g/L, preferably 0.16 to 0.17 g/L, most preferably 0.16 g/L $NaHCO_3$. In another embodiment, the synthetic seawater comprises 2.1 to 2.9 g/L $CaCl_2$)-$2H_2O$, preferably 2.2 to 2.8 g/L, preferably 2.3 to 2.7 g/L, preferably 2.3 to 2.6 g/L, preferably 2.3 to 2.5 g/L, preferably 2.3 to 2.4 g/L, most preferably 2.39 g/L $CaCl_2 \cdot 2H_2O$. In another embodiment, the synthetic seawater comprises 17.1 to 17.9 g/L $MgCl_2 \cdot 6H_2O$, preferably 17.2 to 17.8 g/L, preferably 17.3 to 17.7 g/L, preferably 17.4 to 17.7 g/L, preferably 17.5 to 17.7 g/L, preferably 17.6 to 17.7 g/L, most preferably 17.64 g/L $MgCl_2 \cdot 6H_2O$. In another embodiment, the synthetic seawater comprises 41.1 to 41.9 g/L NaCl, preferably 41.1 to 41.8 g/L, preferably 41.1 to 41.7 g/L, preferably 41.1 to 41.6 g/L, preferably 41.1 to 41.5 g/L, preferably 41.1 to 41.4 g/L, preferably 41.1 to 41.3 g/L, preferably 41.1 to 41.2 g/L, most preferably 41.17 g/L NaCl. In a preferred embodiment, the synthetic water comprises 6.34 g/L $Na_2SO_4$, 0.16 g/L $NaHCO_3$, 2.39 g/L $CaCl_2 \cdot 2H_2O$, 17.64 g/L $MgCl_2 \cdot 6H_2O$, and 41.17 g/L NaCl. In one embodiment, the synthetic seawater comprises 60 to 70 g/L of total dissolved solids (TDS), preferably 61 to 69 g/L, preferably 62 to 68 g/L, preferably 63 to 68 g/L, preferably 64 to 68 g/L, preferably 65 to 68 g/L, preferably 66 to 68 g/L, preferably 67 to 68 g/L, most preferably 67.70 g/L TDS.

The aqueous solution may optionally comprise any number of suitable additives. Exemplary additives include, but are not limited to, weighting agents, emulsifiers, viscosities, fluid-loss control agents, bridging agents, pH controlling agents, defoamers, clay stabilizers, anti-scalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, and the like. A person of ordinary skill in the art, with the benefit of this disclosure, will recognize the types and suitable amounts of additives that may be included in the aqueous solution for a particular application, without undue experimentation.

In some embodiments, the foaming agent is an aqueous solution that further comprises a polymer selected from xanthan gum, guar gum, starch, and polyanionic cellulose.

In some embodiments, the foaming agent is an aqueous solution that further comprises polyanionic cellulose.

In one or more embodiments, the foaming agent forms bubbles having a spherical or polyhedron shape, preferably bubbles having a spherical.

The foaming agent of the present disclosure can be used for drilling operations. The amount of the gemini amphiphile present in the foaming agent may vary depending on the drilling operation, wellbore conditions, and the nature of other components in the foaming agent. However, typically, the gemini amphiphile disclosed herein in any of its embodiments is present in an amount of 0.001 to 5 wt. % relative to the total weight of the foaming agent, preferably 0.005 to 4.5 wt. %, preferably 0.01 to 4 wt. %, preferably 0.015 to 3.5 wt. %, preferably 0.02 to 3 wt. %, preferably 0.025 to 2.5 wt. %, preferably 0.03 to 2 wt. %, preferably 0.035 to 1.5 wt. %, preferably 0.04 to 1 wt. %, preferably 0.045 to 0.5 wt. %, preferably 0.05 to 0.5 wt. %, preferably 0.055 to 0.5 wt. %, preferably 0.06 to 0.5 wt. %, preferably 0.065 to 0.5 wt. %, preferably 0.07 to 0.5 wt. %, preferably 0.075 to 0.5 wt. %, preferably 0.08 to 0.5 wt. % preferably 0.085 to 0.5 wt. %, preferably 0.09 to 0.5 wt. %, preferably 0.095 to 0.5 wt. %, preferably 0.1 to 0.5 wt. %, preferably 0.15 to 0.5 wt. %, preferably 0.2 to 0.5 wt. %, preferably 0.25 to 0.5 wt. %, preferably 0.3 to 0.5 wt. %, preferably 0.35 to 0.5 wt. %, preferably 0.4 to 0.5 wt. %, preferably 0.45 to 0.5 wt. %, most preferably 0.5 wt. % relative to the total weight of the foaming agent. In another embodiment, the gemini amphiphile is present in the foaming agent in an amount of 0.1 to 2 wt. % relative to the total weight of the foaming agent. In a preferred embodiment, the gemini amphiphile is present in the foaming agent in an amount of 0.5 wt. % relative to the total weight of the foaming agent.

Another aspect of the present disclosure relates to a method 100 of underbalanced drilling by the foaming agent, as shown in FIG. 1. The order in which the methods 100 are described is not intended to be construed as a limitation, and any number of the described method steps may be combined in any order to implement the method 100. Additionally, individual steps may be removed or skipped from method 100 without departing from the spirit and scope of the present disclosure.

At step 102, the method 100 comprises drilling into a subterranean geological formation to form a wellbore therein. The subterranean geological formation comprises a shale formation, a clay formation, a carbonate formation, a sandstone formation, or a like formation. In preferred embodiments, the subterranean geological formation is a shale formation, which contains clay minerals and quartz. In another preferred embodiment, the subterranean geological formation is a clay formation containing chlorite, illite, kaolinite, montmorillonite and smectite. In some embodiments, the subterranean geological formation is a carbonate formation, e.g. limestone or dolostone, which contains carbonate minerals, such as calcite, aragonite, dolomite, etc, or a sandstone formation, for example, a formation that contains quartz, feldspar, rock fragments, mica and numerous additional mineral grains held together with silica and/or cement. A wellbore refers to a hole, usually a single cylindrical hole, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations). The wellbore may also be configured to be in fluidic communication with the surface, such as in fluidic communication with a surface facility that may include oil/gas/water separators, gas compressors, storage tanks, pumps, gauges, sensors, meters, pipelines, etc. In one embodiment, the wellbore is a vertical wellbore, a horizontal wellbore, a multilateral wellbore, or an extended reach wellbore.

At step 104, the method 100 comprises injecting the foaming agent into the wellbore during drilling at a wellbore pressure below the pore pressure of the subterranean geological formation. The foaming agent forms a foam in the wellbore at a drilling surface at the bottom. A drilling foam is a composition of gas, liquid, and foaming agent, typically a surfactant. A drilling foam may also be defined as the dispersion of gas in a continuous liquid phase, held together by the surfactant. The gas phase in foam can consist of nitrogen, air, carbon dioxide, or natural gas, while the liquid phase can be either water for aqueous-based foams or diesel/hydrocarbon oil for non-aqueous drilling foam systems.

Drilling foams are characterized by their high viscosity and low density, compared to other UBD fluids, which allows for effective cuttings transport and underbalanced conditions. Foam drilling avoids potential formation damage with conventional overbalanced drilling methods. Because foam systems have good inherent viscosity and fluid-loss control properties, they are an attractive drilling medium that can prevent fluid loss, minimize formation damage, and ensure reliable hole cleaning.

When designing a drilling foam system, the primary concern is maintaining stability in harsh drilling environments while being compatible with water-sensitive formations. To be a suitable foam system for underbalanced drilling, some criteria must be met, such as maintaining enough stability to transport cuttings to the surface, maintaining a mildly alkaline pH range of 9.5 to 10.5 by treating the water, and tolerating the salts that may come into the wellbore from the formation due to underbalanced conditions, such as saline water. In some embodiments, the foaming agent has a pH of 8 to 11, preferably a pH of 8.5 to 10.5, preferably a pH of 9 to 10, most preferably a pH of 9.5.

Both air and nitrogen are two gases commonly employed in foam drilling applications in the field. In certain embodiments, it is observed that regardless of the water salinity, the nitrogen-based foam is more stable by about two-fold than the air-based foam. Nitrogen may generate a more stable foam than air due to its physical properties. Nitrogen is an inert gas which means that it does not react with other chemicals readily. Therefore, it is less likely to form chemical reactions with other components of the foam. Additionally, nitrogen molecules have a larger molecular size than air molecules. As a result, a bubble formed by nitrogen has a thicker shell compared to an air bubble, which makes it more resistant to collapse. In other words, the combination of nitrogen's inertness and increased molecular size gives produces a more stable foam, as compared to a foam produced with air. In one embodiment, the foaming agent comprises DW and has a foam half-life of at least 9 min, preferably at least 10 min, preferably at least 11 min, preferably at least 12 min, preferably at least 13 min, preferably at least 14 min, preferably at least 15 min, preferably at least 16 min, preferably at least 17 min, preferably at least 18 min, preferably at least 19 min, preferably at least 20 min, preferably at least 21 min, preferably at least 22 min, preferably at least 23 min, preferably at least 24 min, preferably at least 25 min, preferably at least 26 min, preferably at least 27 min, preferably at least 28 min, preferably at least 29 min, preferably at least 30 min, preferably at least 31 min, preferably at least 32 min, preferably at least 33 min, preferably at least 34 min, preferably at least 35 min, most preferably at least 36 min. In one embodiment, the foaming agent comprises SW and has a foam half-life of at least 13 min, preferably at least 14 min, preferably at least 15 min, preferably at least 16 min, preferably at least 17 min, preferably at least 18 min, preferably at least 19 min, preferably at least 20 min, preferably at least 21 min, preferably at least 22 min, preferably at least 23 min, preferably at least 24 min, preferably at least 25 min, preferably at least 26 min, most preferably at least 27 min. In one embodiment, the foaming agent further comprises a polymer selected from the group consisting of xanthan gum, guar gum, starch, and polyanionic cellulose and has a foam half-life of at least 55 min, preferably at least 60 min, preferably at least 65 min, preferably at least 70 min, preferably at least 75 min, preferably at least 80 min, preferably at least 85 min, preferably at least 90 min, preferably at least 95 min, preferably at least 100 min, preferably at least 105 min, preferably at least 110 min, preferably at least 115 min, preferably at least 120 min, preferably at least 125 min, preferably at least 130 min, preferably at least 135 min, preferably at least 140 min, preferably at least 145 min, preferably at least 150 min, preferably at least 155 min, preferably at least 160 min, preferably at least 165 min, preferably at least 170 min, preferably at least 175 min, preferably at least 180 min, most preferably at least 184 min. In some embodiments, in presence of air, the foaming agent has a foam half-life that ranges from at least 13 min, preferably at least 14 min, preferably at least 15 min, preferably at least 16 min, preferably at least 17 min, preferably at least 18 min, preferably at least 19 min, preferably at least 20 min, preferably at least 21 min, preferably at least 22 min, preferably at least 23 min, preferably at least 24 min, preferably at least 25 min, preferably at least 26 min, most preferably at least 27 min. In some embodiments, in presence of nitrogen, the foaming agent has a foam half-life that ranges from at least 30 min, preferably at least 35 min, preferably at least 40 min, preferably at least 45 min, preferably at least 50 min, preferably at least 55 min, preferably at least 60 min, preferably at least 65 min, most preferably at least 68 min. In some embodiments, the foaming agent has an initial foam volume ($V_{initial}$) of at least 212 mL, preferably at least 213 mL, preferably at least 214 mL, preferably at least 215 mL, preferably at least 216 mL, preferably at least 217 mL, preferably at least 218 mL, preferably at least 219 mL, most preferably at least 220 mL. In one embodiment, the foaming agent, in the presence of nitrogen, has an initial foam volume ($V_{initial}$) of at least 225 mL, preferably at least 226 mL, preferably at least 227 mL, preferably at least 228 mL, preferably at least 229 mL, preferably at least 230 mL, preferably at least 231 mL, preferably at least 232 mL, preferably at least 233 mL, preferably at least 234 mL, preferably at least 235 mL, preferably at least 236 mL, preferably at least 237 mL, preferably at least 238 mL, preferably at least 239 mL, preferably at least 240 mL, most preferably at least 241 mL. In one embodiment, the foaming agent comprises DW and/or SW and has a drainage half-life ($t_{FLS50\%}$) of at least 91 min, preferably at least 91.5 min, preferably at least 92 min, preferably at least 92.5 min, preferably at least 93 min, preferably at least 93.5 min, preferably at least 94 min, preferably at least 94.5 min, preferably at least 95 min, preferably at least 95.5 min, preferably at least 96 min, preferably at least 96.5 min, most preferably at least 97 min. In one embodiment, the foaming agent further comprises a polymer selected from the group consisting of xanthan gum, guar gum, starch, and polyanionic cellulose and has a drainage half-life ($t_{FLS50\%}$) of at least 155 min, preferably at least 160 min, preferably at least 165 min, preferably at least 170 min, preferably at least 175 min, preferably at least 180 min, preferably at least 185 min, preferably at least 190 min, preferably at least 195 min, preferably at least 200 min, preferably at least 205 min, preferably at least 210 min, preferably at least 215 min, preferably at least 220 min, preferably at least 225 min, preferably at least 230 min, preferably at least 235 min, preferably at least 240 min, preferably at least 245 min, preferably at least 250 min, preferably at least 255 min, preferably at least 260 min, preferably at least 265 min, preferably at least 270 min, preferably at least 275 min, preferably at least 280 min, preferably at least 285 min, preferably at least 290 min, preferably at least 295 min, preferably at least 300 min, preferably at least 305 min, preferably at least 310 min, preferably at least 315 min, preferably at least 320 min, preferably at least 325 min, preferably at least 330 min, preferably at least 335 min, preferably at least 340 min, preferably at least 345 min, most preferably at least 350 min.

At step 106, the method 100 comprises transporting drill cuttings formed by the drilling away from the drilling surface in the foam.

The examples below are intended to further illustrate protocols for preparing, characterizing the surfactants of Formula (I), the drilling fluid, and uses thereof, and are not intended to limit the scope of the claims.

EXAMPLES

The following examples demonstrate the method 100 of underbalanced drilling as described herein. The examples are provided solely for illustration and are not to be construed as limitations of the present disclosure, as many variations are possible without departing from the spirit and scope of the present disclosure.

Example 1: Materials

Figure 2:
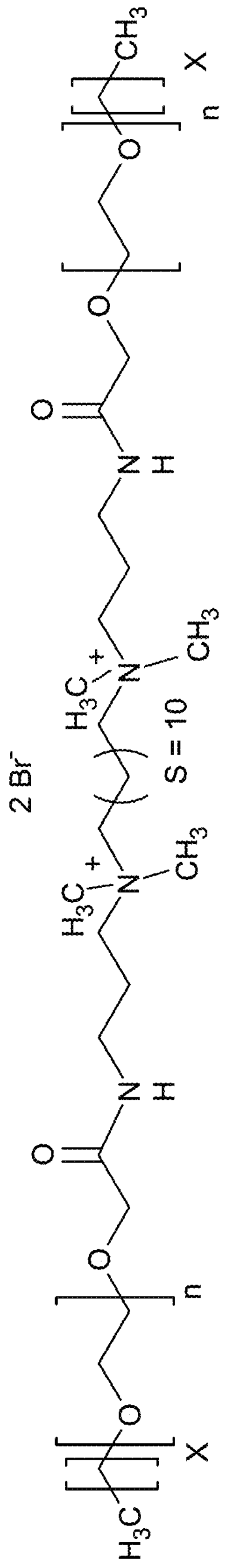
FIG. 2 shows a chemical structure of a foaming agent, according to certain embodiments.

Forming agent: A gemini amphiphile was employed in the present disclosure with a chemical structure shown in FIG. 2. The gemini amphiphile is a dicationic (Br-counter ions) surfactant containing larger linker ($C_{12}$) along with lipophilic tail ($C_{12}$), denoted as GS12. The cationic GS12 foaming agent with a flexible large spacer was prepared through a reaction between glycolic acid ethoxylate lauryl ether and 3-(dimethyl amino)-1-propylamine in the presence of sodium fluoride (NaF) to form an intermediate compound. The intermediate compound was then further reacted individually with 1,12-dibromo dodecane to form GS12.

The attachment of ethoxy groups in the GS12 backbone makes it unique in its nature. Traditional dicationic amphiphiles without ethoxy groups are poorly soluble in high-saline environments. However, the surfactant of the present disclosure showed excellent compatibility with a wide range of brine salinity as well as high reservoir temperatures due to the ethoxy units being properly placed among the lipophilic tail and lipophobic headgroup. The GS12 gemini foaming agent is an environmentally benign surfactant, making it a suitable material for oilfield applications.

Gas phase: Both air and nitrogen were used in the present disclosure since these two gases are commonly employed in foam drilling applications in the field. Nitrogen ($N_2$) gas (99.99% purity) and air stored in pressurized cylinders were used as a source of the gas phase for foaming during the experiments.

Liquid phase: deionized water (DW) sourced from Ultra-pure Milli-Q (18.2 MΩ cm at room temperature) water system. Sea water (SW) was synthesized using ACS-grade salts with concentrations listed in Table 1. For foam drilling applications, it is recommended for the drilling fluid to be mildly alkaline to reduce the risk of corrosion of the drilling string. Therefore, a pH buffer solution of 5M Potassium Hydroxide (KOH) was used to adjust the prepared foaming solutions in the range of 9 to 10.

TABLE 1

The mineral composition of the synthesized sea water and formation water used in the present disclosure.

| Index | Composition | Synthetic Sea Water (g/L) |
|---|---|---|
| 1 | $Na_2SO_4$ | 6.34 |
| 2 | $NaHCO_3$ | 0.16 |
| 3 | $CaCl_2 \cdot 2H_2O$ | 2.39 |
| 4 | $MgCl_2 \cdot 6H_2O$ | 17.64 |
| 5 | NaCl | 41.17 |
| Total dissolved solids (TDS) - g/L | | 67.70 |

Polymer: Poly Anionic Cellulose (PAC) is a water-soluble polymer that is used in various oilfield applications, i.e., drilling fluids. PAC has a high molecular weight and a high degree of anionic substitution, which makes it a viable stabilizer for foam systems. A sample of commercial white powder under the name of POLYPAC-R was used to generate polymer foams.

TABLE 2

Physical properties of the used sample of PAC polymer.

| Property | Description |
|---|---|
| Color | White |
| Specific gravity | 1.5-1.6 |
| pH in 1% aqueous solution | 6.5-8 |
| Temperature stability | 49° C. |

Example 2: Sample Preparation

The liquid foaming solutions were prepared by dissolving the surfactant with the desired concentration in water using a volumetric flask and a magnetic stirrer. Droplets of 5M Potassium Hydroxide (KOH) solution were added to increase the pH of the prepared solutions to be in the range of 9 to 10. The other additives, i.e., polymer, were then added with the decided concentration to the solution. Finally, the solutions were kept for mixing over a few hours to ensure solution homogeneity before commencing foaming testing.

Example 3: Foaming Testing

Figure 3:
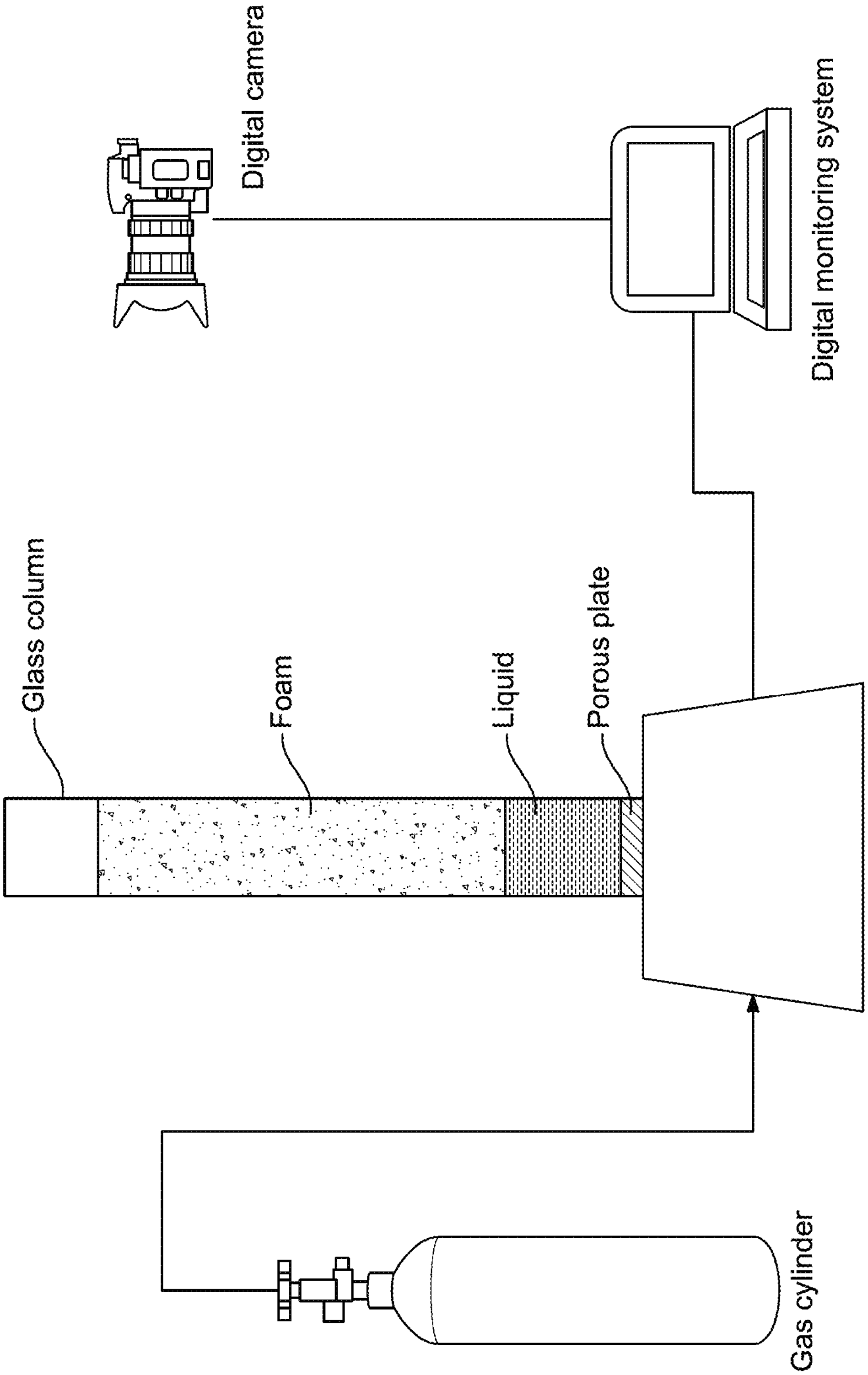
FIG. 3 shows a schematic drawing of a Dynamic Foam Analyzer (DFA 100) used to evaluate foam properties, according to certain embodiments.

The Dynamic Foam Analyzer (DFA 100) was used to assess the foaming properties. All measurements were conducted at 25° C. and atmospheric pressure. A 50 mL of the surfactant solution was introduced via syringe into a glass column, which was equipped with prisms for visualization of foam structure and a calibration grid to measure bubble size. The column was situated between a linear LED panel and a line sensor to measure foam height and volume. Gas (Air or $N_2$), 150 mL, was pumped into the solution from the bottom through a porous filter paper with pore sizes ranging from 16 to 50 micrometer (m). The software evaluated the number of bubbles, bubble size, and foam volume decay over time. All experiments were repeated at least three times, and the average values of these readings are reported. FIG. 3 shows a schematic of the DFA 100 apparatus used in the present disclosure.

Example 4: Scope of Experiments

In the present disclosure, the foaming systems generated using the novel GS12 surfactant are characterized to assess performance at high pH conditions typically similar to the drilling environments. Such analysis provides guiding insights into the foaming stability and foamability of this surfactant. Foaming experiments investigated the effect of surfactant concentration, liquid phase salinity, the gas type, adding polymer on foam stability, foamability, and foam structure of GS12 foams. Samples of the liquid phase were considered varying the surfactant concentration (0.1:2.0 wt. %). Samples of water with different levels of salinity were tested by mixing deionized water and sea water at different ratios. The ratios tested included 100% deionized water, 25% sea water+75% deionized water, 50% sea water+50% deionized water, 75% sea water+25% deionized water, and 100% sea water. Moreover, the impact of adding PAC polymer on foaming was investigated.

TABLE 3

Experimental testing matrix for the GS12 foaming agent.

| Test Index | Testing Apparatus | Studied Impact | Water Type | Gas Type | Surfactant Concentration (wt. %) |
|---|---|---|---|---|---|
| 1 | Dynamic | Surfactant | DW | Air | 0.1 |
| 2 | Foam | Concen- | | | 0.5 |
| 3 | Analyzer | tration | | | 1 |
| 4 | (DFA) | | | | 1.5 |
| 5 | | | | | 2 |
| 6 | | Water | DW | Air | 0.5 |
| 7 | | Salinity | 25% SW | | |
| 8 | | | 50% SW | | |
| 9 | | | 75% SW | | |
| 10 | | | SW | | |
| 11 | | Gas Type | DW | Air | 0.5 |
| 12 | | | | Nitrogen | |
| 13 | | | SW | Air | |
| 14 | | | | Nitrogen | |
| 15 | | Adding | DW | Air | 0.5 |
| | | Polymer | | Nitrogen | |
| 16 | | | SW | Air | 0.5 |
| | | | | Nitrogen | |

Example 5: Foam Stability

The DFA 100 tester was used to evaluate the foam stability of the prepared foaming systems and study how it is impacted by different parameters, i.e., surfactant concentration, water salinity, gas type, and adding polymer. The foam stability is inferred from the foam half-life ($H_0$).

Example 6: Surfactant Concentration

Figure 4:
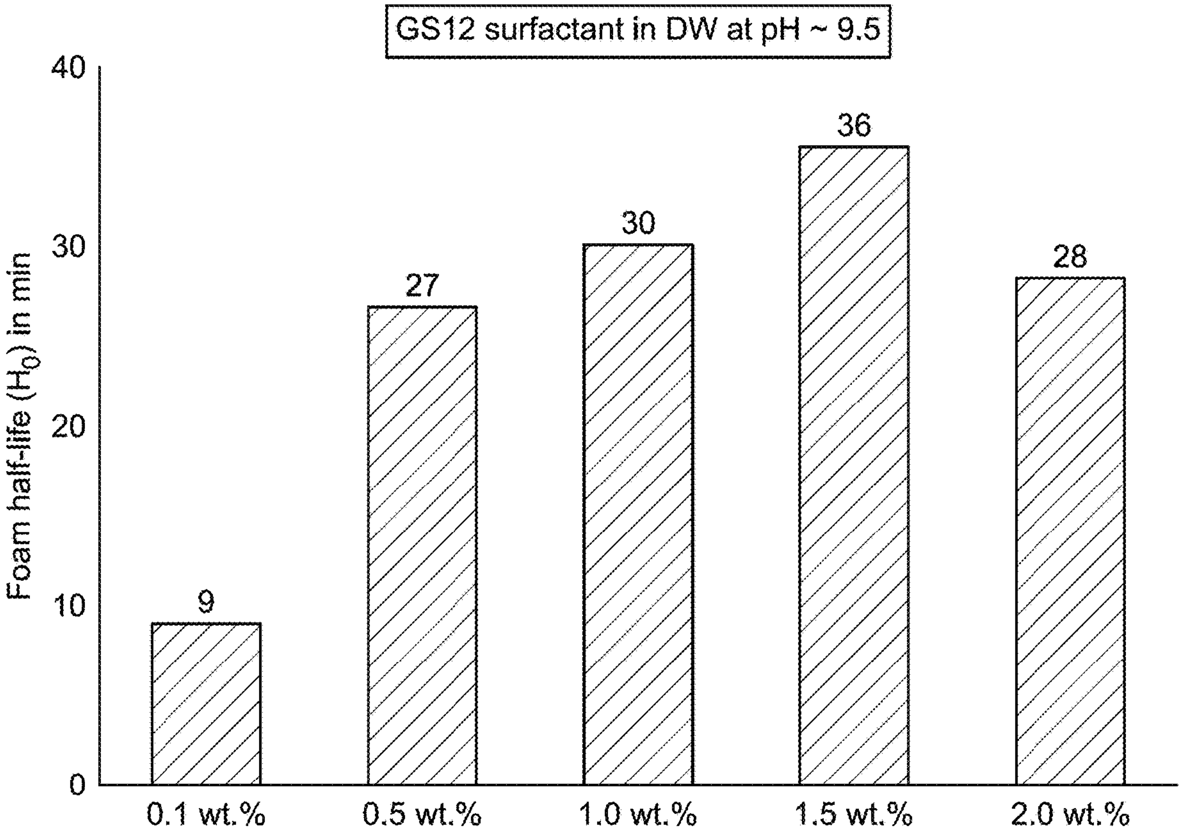
FIG. 4 shows foam half-life for foaming solutions with different surfactant concentrations in the presence of air and deionized water (DW) in a mildly alkaline environment, according to certain embodiments.
Figure 5:
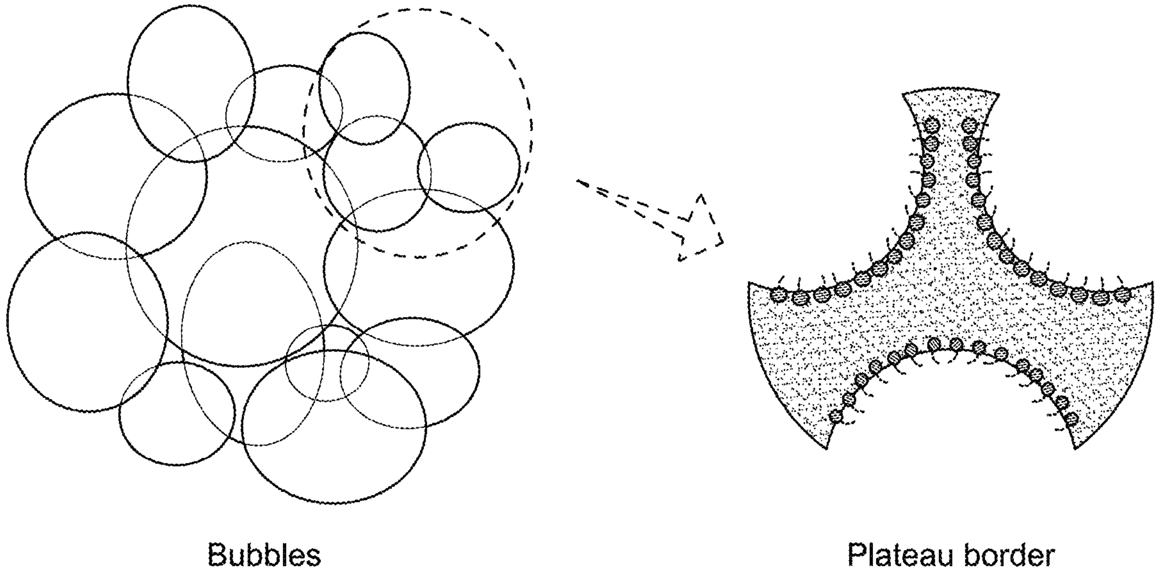
FIG. 5 shows schematic diagram of morphology at air-liquid interface of foam systems, according to certain embodiments.

The tested solutions were prepared by dissolving different concentrations of GS12 surfactant (0.1 to 2.0 wt. %) into DW and adding droplets of KOH to establish a mildly alkaline environment (pH ~9.5). FIG. 4 depicts the foam half-life for different GS12 surfactant concentrations in the presence of air. In the present disclosure, it was found that increasing the GS12 concentration resulted in more stable foam. The foam was most stable at a concentration of 1.5 wt. %, and less stable foam was observed when the concentration exceeded this level. Surfactant molecules tend to cluster at the air-liquid interface, forming a monolayer that stabilizes the foam bubbles and prevents them from coalescing and collapsing. Therefore, increasing the surfactant concentration in the liquid solution increases the number of surfactant molecules available to adsorb at the air-liquid interface. This leads to a decrease in surface tension and an increase in foam stability because more surfactant molecules can form a denser and more cohesive monolayer at the liquid-air interface (plateau border) as shown in FIG. 5. However, beyond a certain point, adding more surfactant to the solution may lead to a decrease in foam stability. This can be explained as, at very high concentrations, surfactant molecules can start to aggregate and form micelles in the bulk liquid, reducing the availability of surfactant molecules at the air-liquid interface and decreasing the ability of the surfactant to stabilize the foam bubbles. The stability of foam decreases at higher concentrations due to the excess molecules of surfactant at the lamella. The excess of surfactant molecules increases the impact of gravitation on the drainage of foam, which results in constant liquid drainage from the film formed between adjacent bubbles. This eventually ruptures the foam film resulting in bubble coalescence. From these results, an optimum concentration of 1.5 wt. % was concluded for stable GS12 foam that maximizes foam stability. Furthermore, it is observed that increasing the GS12 concentration from 0.5 to 1.5 wt. % (by three times) only improved the foam half-life (i.e., the time it takes for the foam volume to decrease to half of its initial value) by ~30%, which may not justify the additional cost of using more surfactant. Therefore, it was determined that 0.5 wt. % of GS12 was sufficient to achieve a stable foam for UBD applications in mildly alkaline environments.

Example 7: Water Salinity

Figure 6:
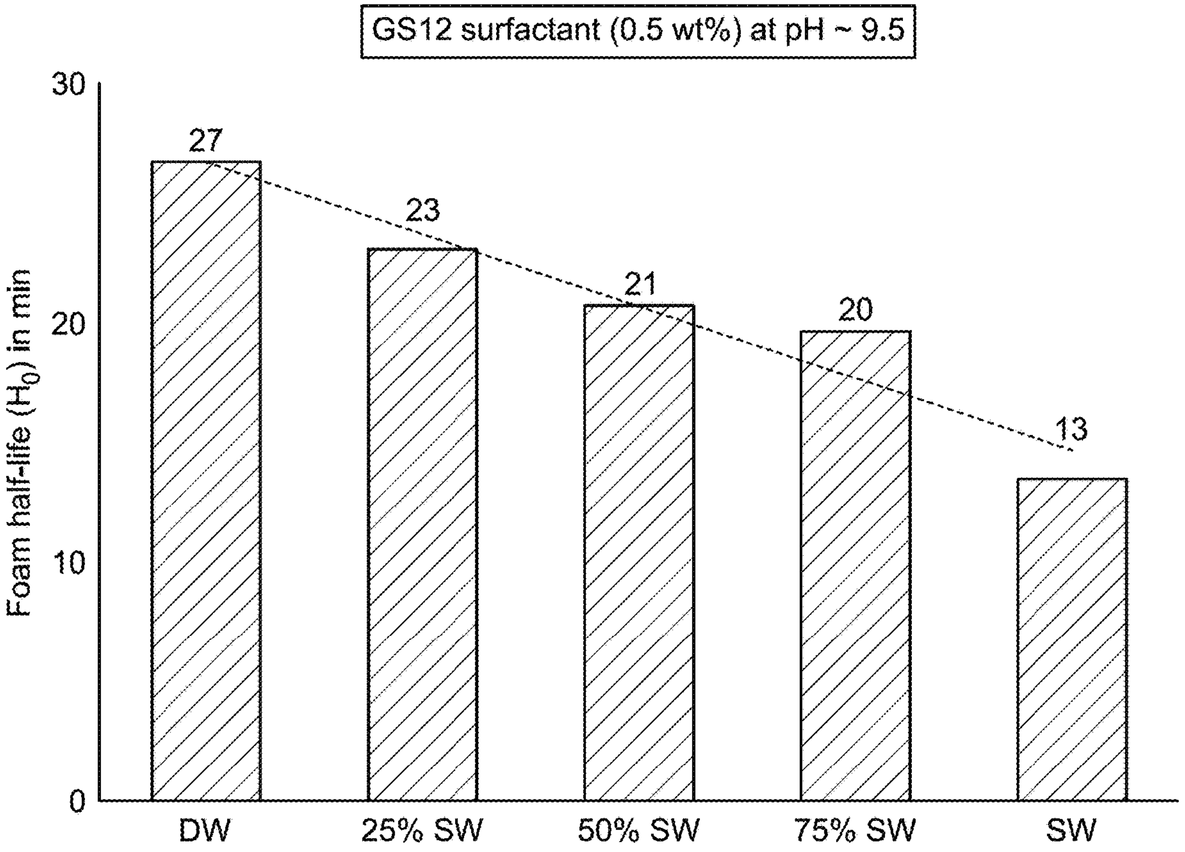
FIG. 6 shows foam half-life for the foaming solutions with different water salinities in the presence of air in a mildly alkaline environment, according to certain embodiments.
Figure 7:
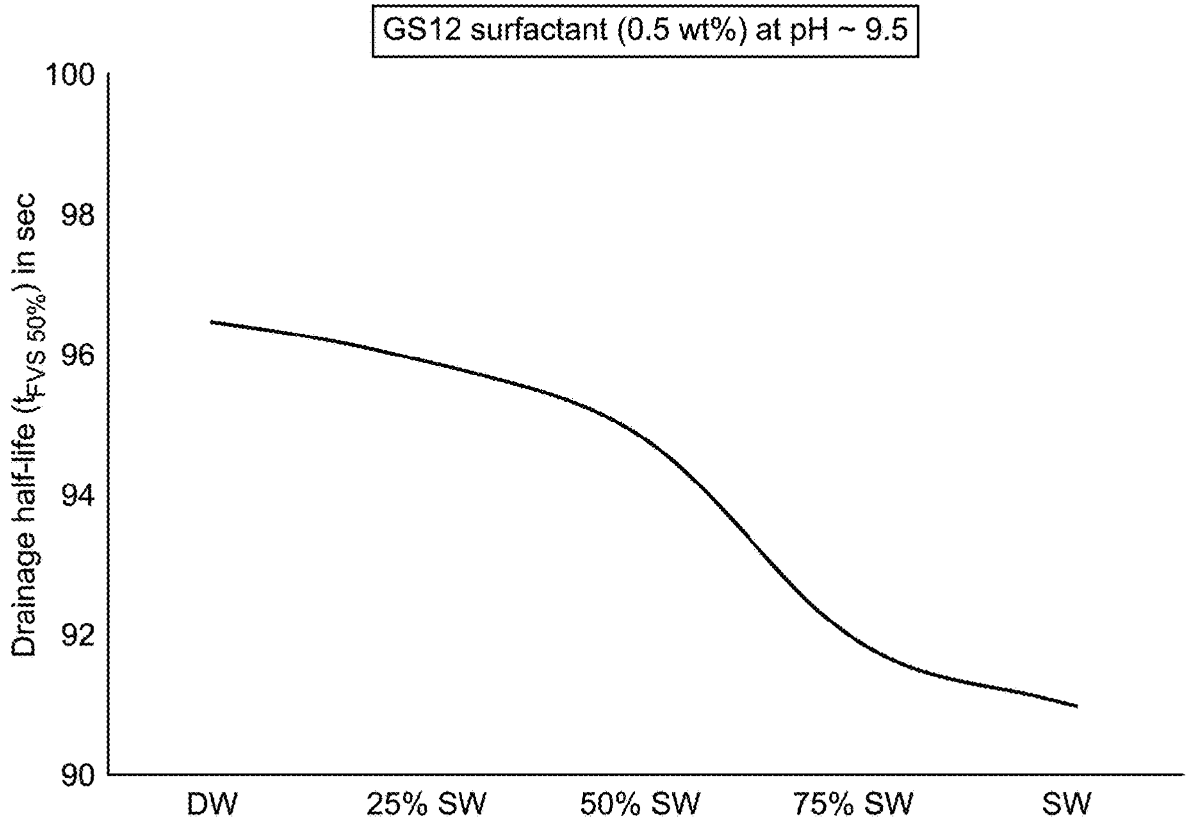
FIG. 7 shows drainage half-life ($t_{FLS\ 50\%}$) for foams with different water salinities, according to certain embodiments.

The chemistry of water is a crucial factor in foam stability. The impact of salinity on foam stability can vary depending on the type of surfactant utilized. The foam stability decreases with an increase in salt concentration. However, the addition of NaCl to a nonionic surfactant solution can elevate foam stability up to a certain level. To investigate how the salinity of water affects foam stability, a series of experiments were carried out to evaluate foam stability up to the half-life time. During the experiments, the concentration of the GS12 surfactant was kept constant at 0.5 wt. %. Different samples of seawater (SW) were used at varying dilution levels, including 25%, 50%, 75%, and 100% SW diluted with deionized water (DW). FIG. 6 illustrates the foam half-life of the GS12 surfactant under different water salinities in the presence of air at pH ~9.5. The findings revealed that an increase in the salinity of the liquid phase reduced the foam half-life, with a maximum reduction of twofold observed in the presence of SW. This can be explained as the presence of dissolved salts in the liquid phase can disrupt the structure of the foam, leading to coalescence and drainage of the foam bubbles. When a solution is mixed with air to form a foam, the surface tension of the liquid phase plays a crucial role in stabilizing the bubbles. Foam stability is determined by a delicate balance between the drainage of liquid from the bubbles, which increases with time, and the resistance of the surface tension to this drainage. In a low salinity environment, the surface tension of the liquid phase is high enough to overcome the weight of the liquid draining from the foam, thus helping to stabilize the bubbles. However, with increasing salinity, the presence of charged particles or ions in the solution can lead to a reduction in surface tension, thus weakening the structure of the foam bubbles and increasing the drainage rate. This finding was supported by the decreasing trend of the drainage half-life time (t FLS 50%), (which is the time at which 50% of the liquid phase has been drained out of foam). As shown in FIG. 7, the drainage rate became faster (lower $t_{FLS\ 50\%}$) with increasing salinity, leading to lower foam stability. Furthermore, the ionic strength of the solution can also affect the stability of the foam. As the concentration of dissolved salts increases, the electrical double layer surrounding the bubbles becomes compressed, leading to increased repulsion between the bubbles and a reduction in foam stability. The results obtained in the present disclosure demonstrate the importance of water chemistry on foam stability with a specific type of surfactant.

Example 8: Addition of a Polymer

Figure 8:
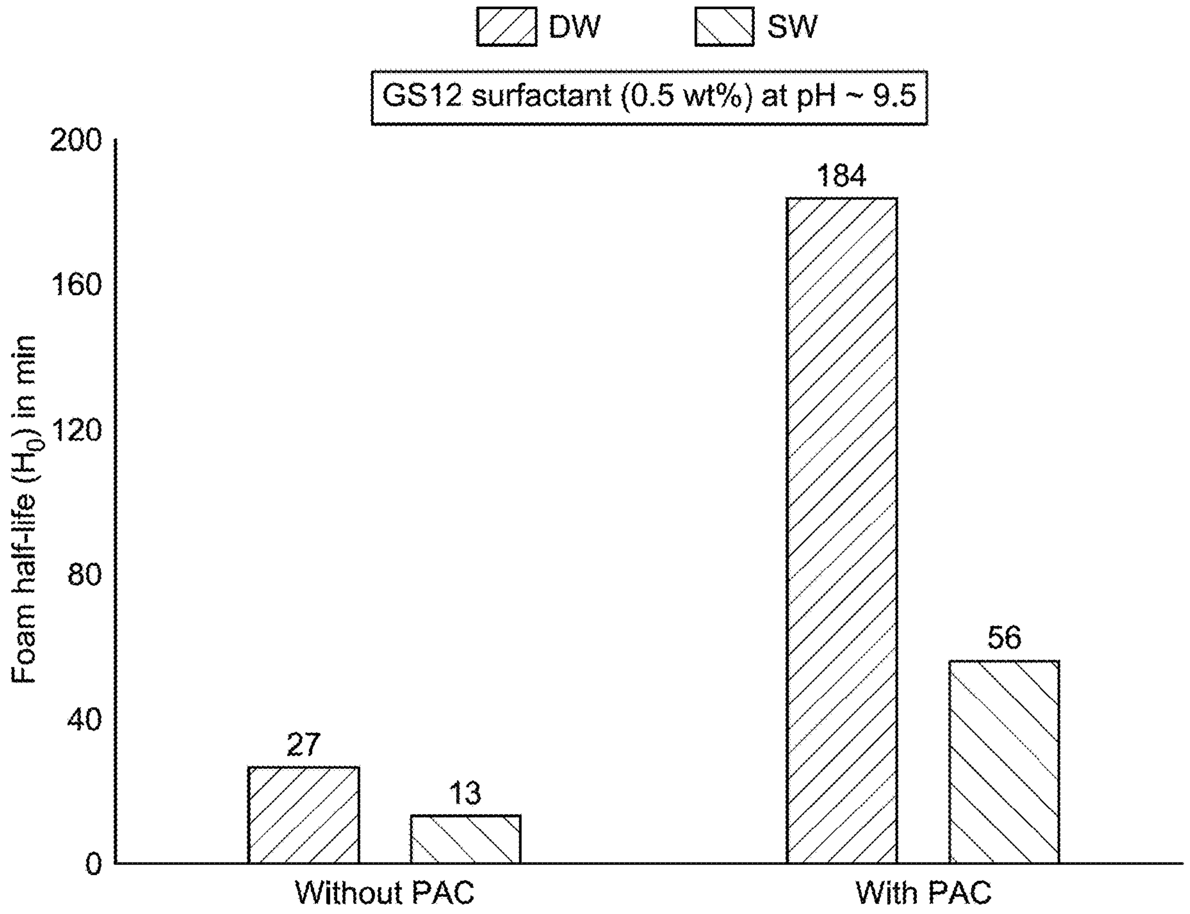
FIG. 8 shows foam half-life of foaming solutions with/without adding polyanionic cellulose (PAC) in a mildly alkaline environment, according to certain embodiments.
Figure 9:
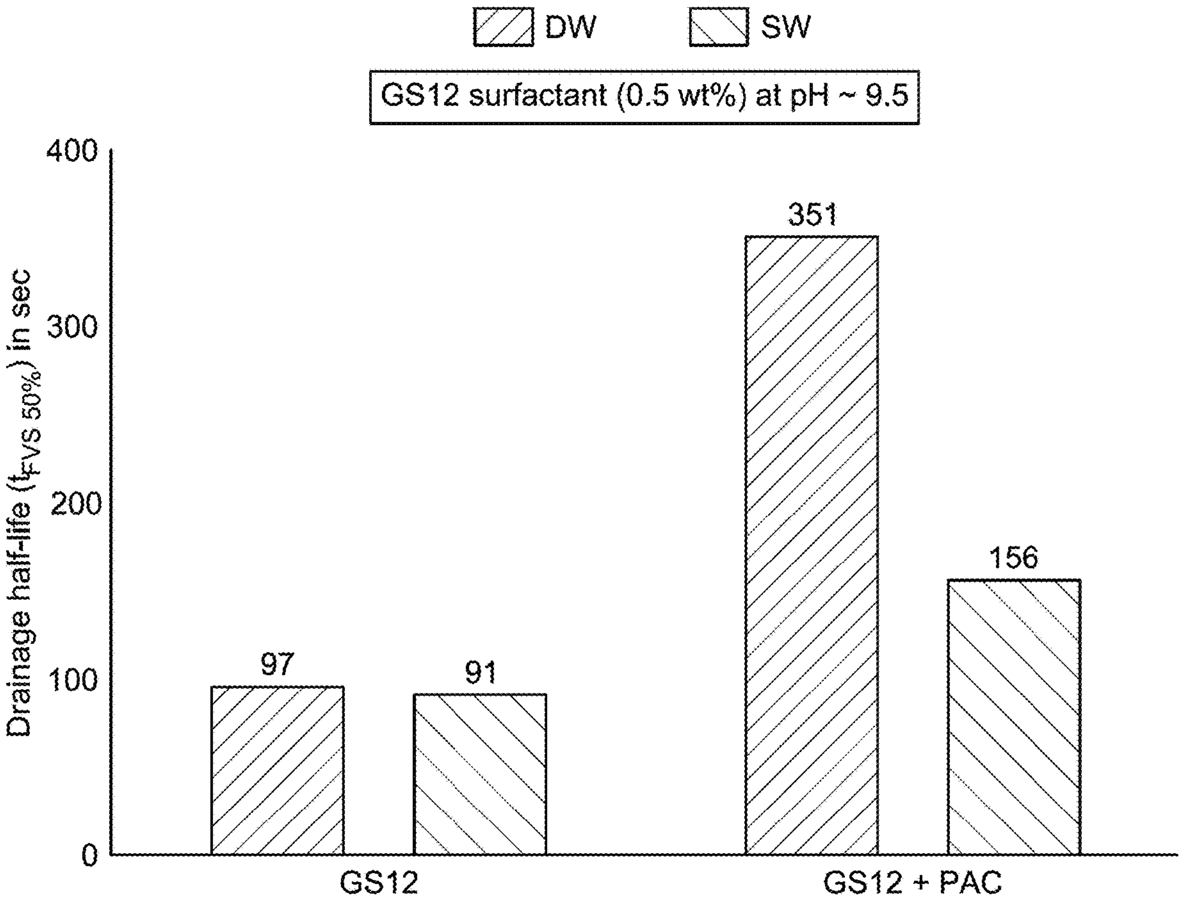
FIG. 9 shows drainage half-life ($t_{FLS\ 50\%}$) graph illustrating impact of adding PAC to GS12 solution with different salinities, according to certain embodiments.

Underbalanced drilling can be performed using different types of foams. Foam drilling can be classified as stable foam (water-based foam) or stiff foam (polymer foam). In stable foams, the liquid phase can contain surfactants, salts, and corrosion inhibitors. These additives do not significantly impact the viscosity of the liquid phase. Stiff foams contain viscosifier in addition to these additives. Some of the polymers are used to viscosify the base fluid for foam generation. Stiff foams have structures similar to those found in aqueous foams. However, they are more stable. In the present disclosure, polyanionic cellulose (PAC) polymer was selected to evaluate the impact of adding polymer as a foam stabilizer to boost its stability. PAC is a cost-effective additive to many water-based drilling fluids with high acid and salt-resistance ability. PAC can be used as a thickening agent, rheology controller, suspending agent, and filtrate reducer. Moreover, it is an environmentally friendly polymer that is effective over a wide range of pH environments. Therefore, two more experiments were conducted where 3 g/L PAC was added to GS12 (0.5 wt. %) foaming solution to assess the PAC polymer effect on foam stability. The experiments were conducted in the presence of air using both DW and SW. FIG. 8 shows the impact of adding PAC on the stability of the generated GS12 foam. The findings of the present disclosure indicated that the use of PAC polymer significantly increased foam stability, specifically by approximately seven and four times, in the case of using DW and SW liquid base fluids respectively. This observation can be explained as increasing the viscosity of the surfactant solutions by adding polymers can impact foam stability as evidenced by previous experimental studies. Given that, the polymer molecules can form a network structure on the film, it can effectively boost the viscosity of the solution. Being a dispersed gas in a liquid phase, the thickness of the foam film plays an important role in the foam's stability. Thicker foam films are less prone to rupture. Weak drainage of the solution leads to a slower thinning of the foam film, and an increase in solution viscosity can mitigate this drainage, resulting in a lower defoaming rate and stronger foam stability. Therefore, higher viscosity can lead to a weaker drainage rate in the foam film and improve foam stability. This claim is supported by the results shown in FIG. 9 which illustrates that polymer GS12 foams had a lower drainage rate inferred from the higher t FLS 50% values compared to non-polymer GS12 foams. While an increase in water salinity has been found to decrease the stability of GS12 foam, the present disclosure suggests a solution to the problem by using PAC polymer to enhance its stability and make SW a viable alternative to freshwater in underbalanced drilling. This is particularly beneficial in regions where freshwater is scarce.

Example 9: Gas Type

Figure 10:
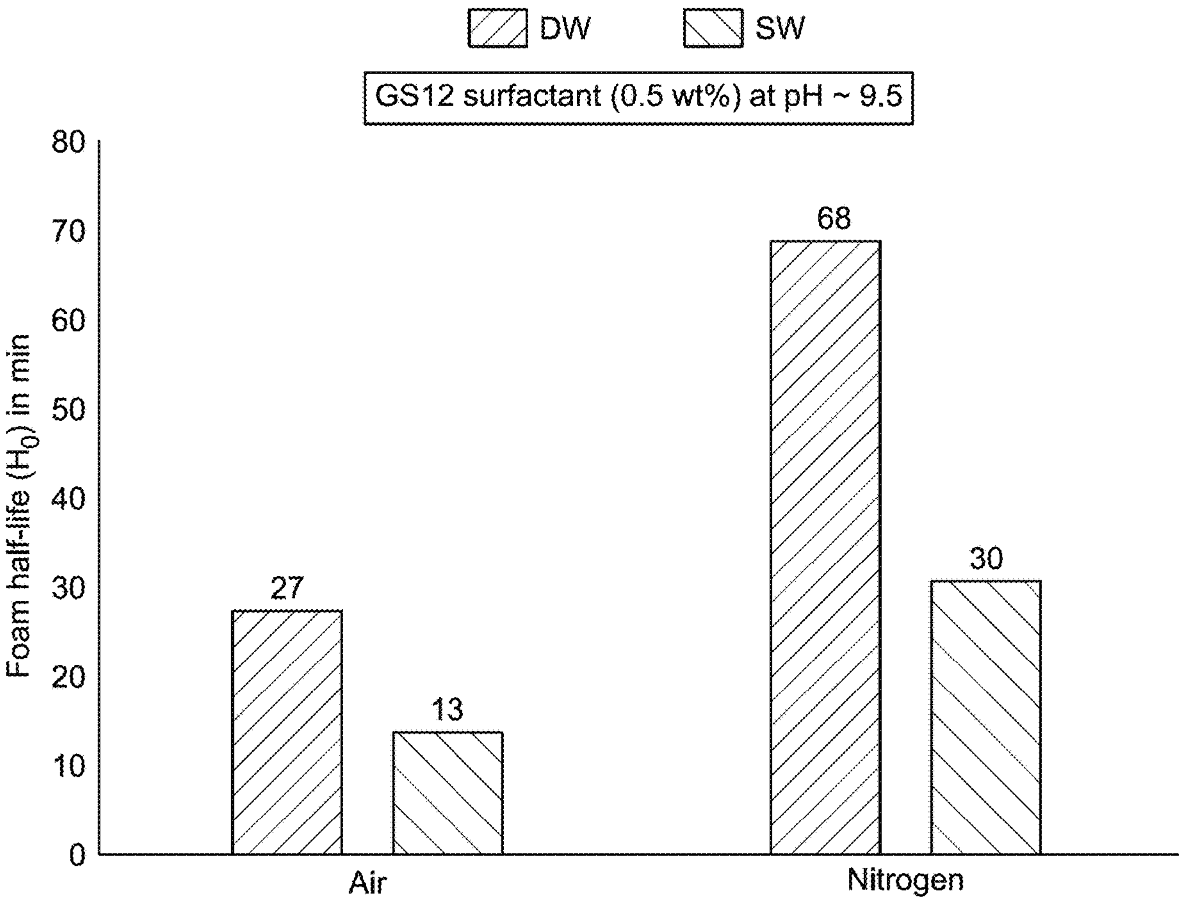
FIG. 10 shows foam half-life of foaming solutions using DW and sea water (SW) in the presence of air and nitrogen, according to certain embodiments.

The type of gas used for foaming plays a prominent role in the foaming stability. To assess the impact of gas type on foam stability, GS12 foam (0.5 wt. %) was tested using both air and nitrogen. FIG. 10 shows the foam half-life of GS12 foam using DW and SW (at pH ~9.5) in the presence of air and nitrogen. The results show that, regardless of the water salinity, the nitrogen-based foam is more stable by about two-fold than the air-based foam. The reason why nitrogen generates a more stable foam than air may be due to its physical properties. Nitrogen is an inert gas which means that it does not react with other chemicals readily. Therefore, it is less likely to form chemical reactions with other components of the foam. Additionally, nitrogen molecules have a larger molecular size than air molecules. As a result, a bubble formed by nitrogen has a thicker shell compared to an air bubble, which makes it more resistant to collapse. In other words, the combination of nitrogen's inertness, and larger molecular size gives it a privilege over using air for producing more stable foam.

Example 10: Foamability

Figure 11A:
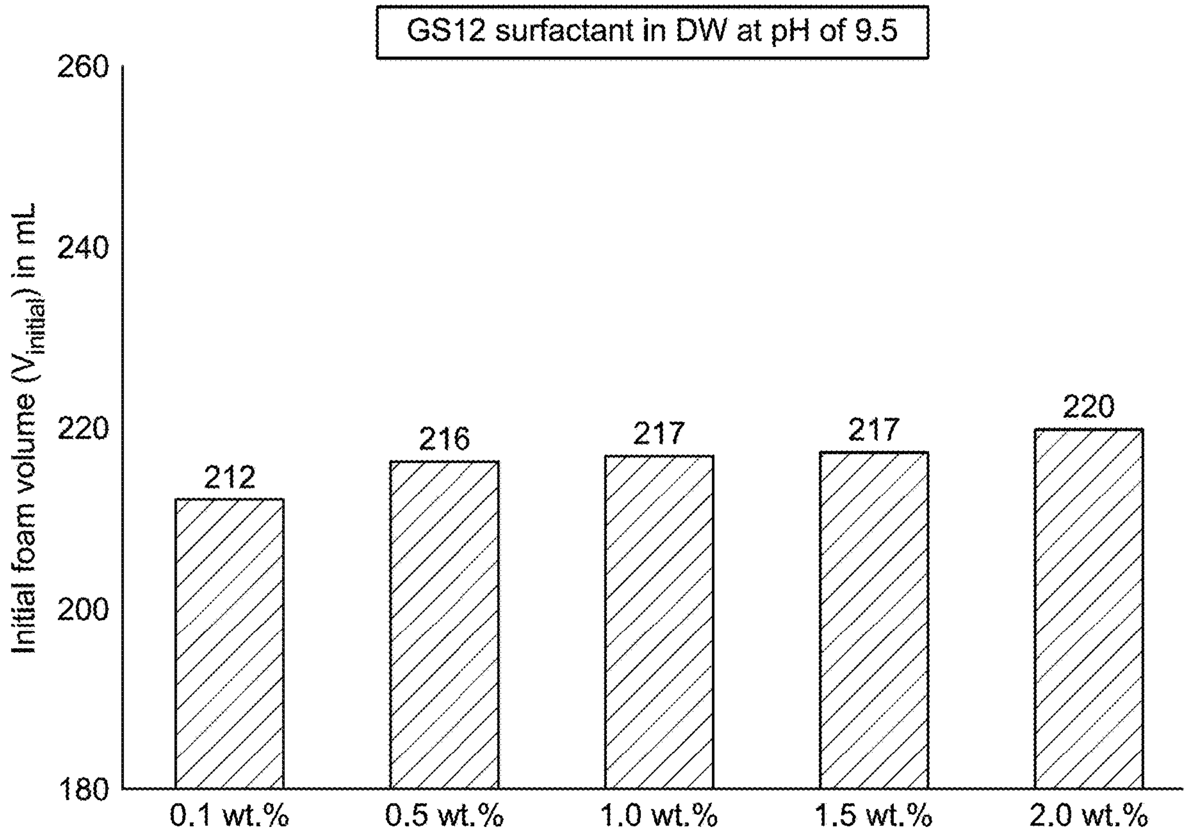
FIG. 11A shows foamability of the foaming solutions with surfactant concentration, according to certain embodiments.
Figure 11B:
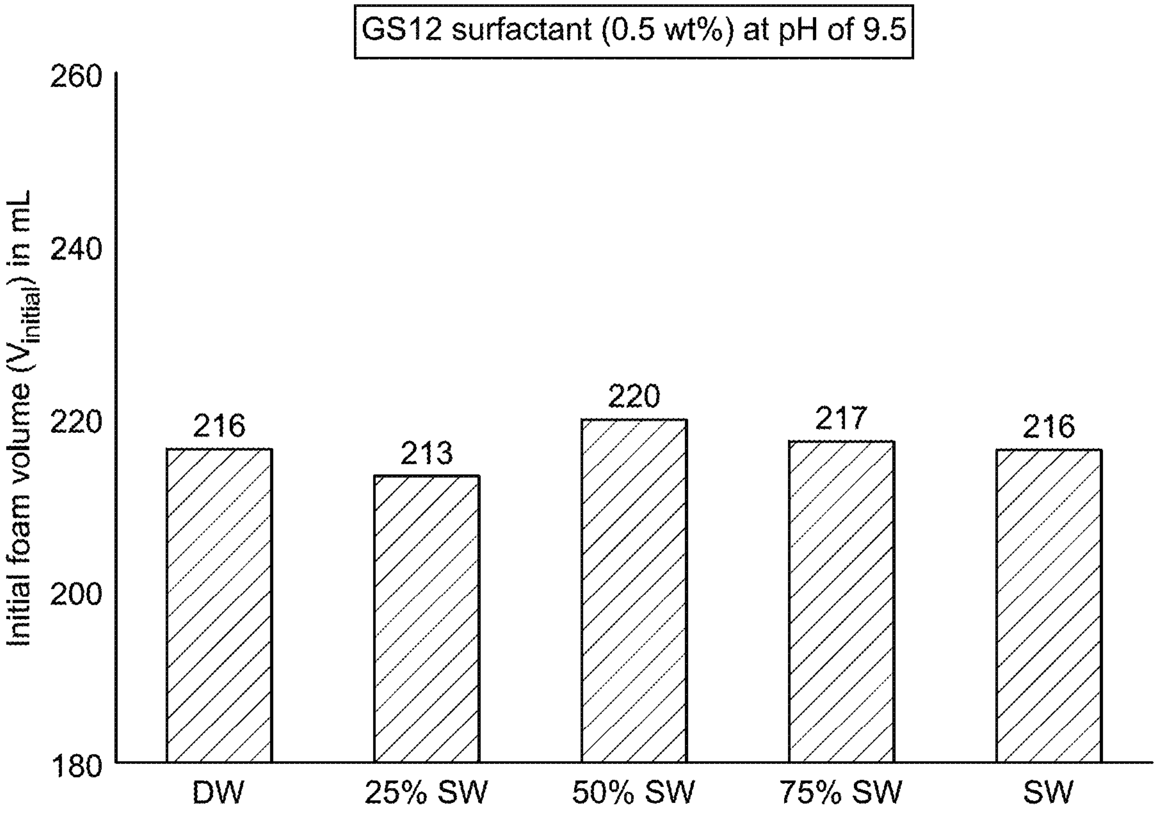
FIG. 11B shows foamability of the foaming solutions with water salinity, according to certain embodiments.
Figure 11C:
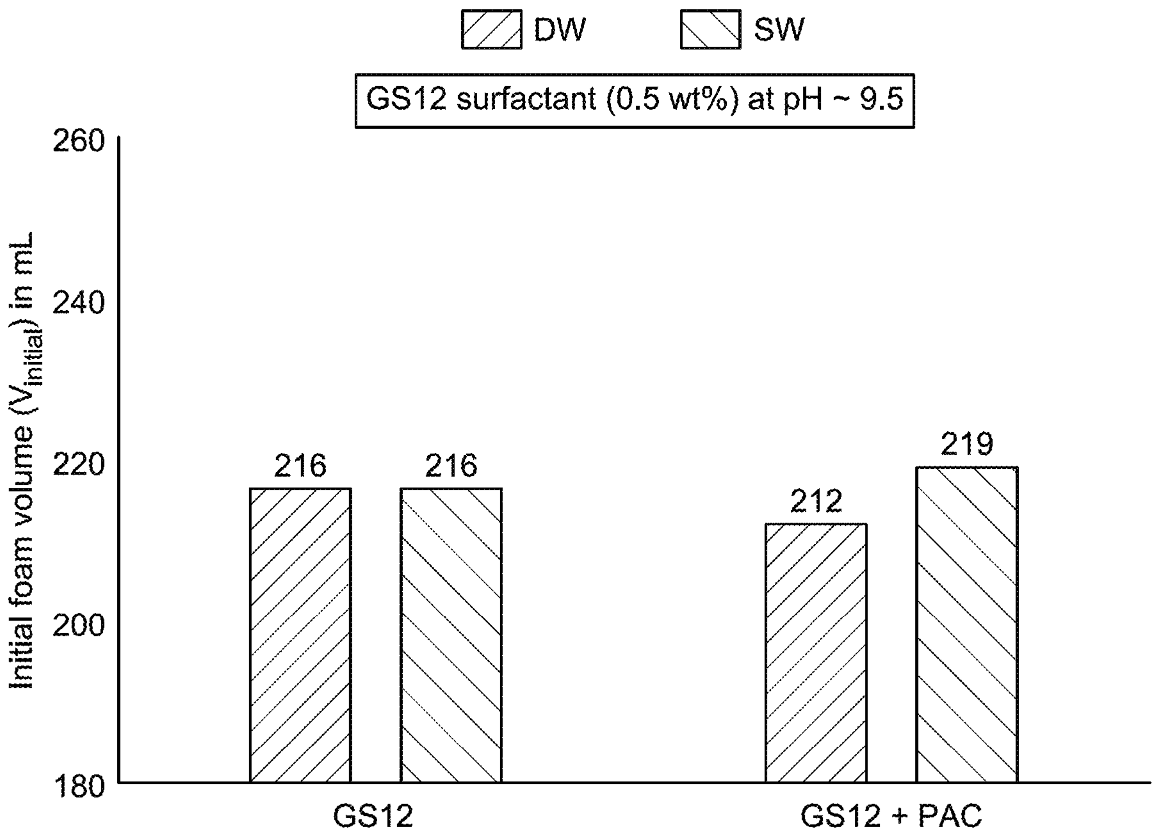
FIG. 11C shows foamability of the foaming solutions with PAC polymer added, according to certain embodiments.

The foamability of a surfactant refers to its ability to generate foam regardless of its properties. It can be described by the initial foam volume ($V_{initial}$) generated once the gas injection through the porous plate has stopped. FIG. 11A, FIG. 11B, and FIG. 11C show the foamability in terms of the initial foam volume for the GS12 surfactant with varying components of the foaming system; the gas phase or the liquid phase chemistry. It is observed that all the tested systems exhibited almost the same foamability indicated by the slight difference in $V_{initial}$ values that ranged from 212 to 220 mL when air is utilized as a gas phase. Therefore, it is concluded that surfactant concentration, water chemistry, and adding polymer have no significant impact on the foamability of the GS12 surfactant at high pH environments. Moreover, it should be stated that foamability does not reflect foam stability. For instance, all the air-foamed systems almost have the same $V_{initial}$, yet each system has a different foam half-life.

Figure 11D:
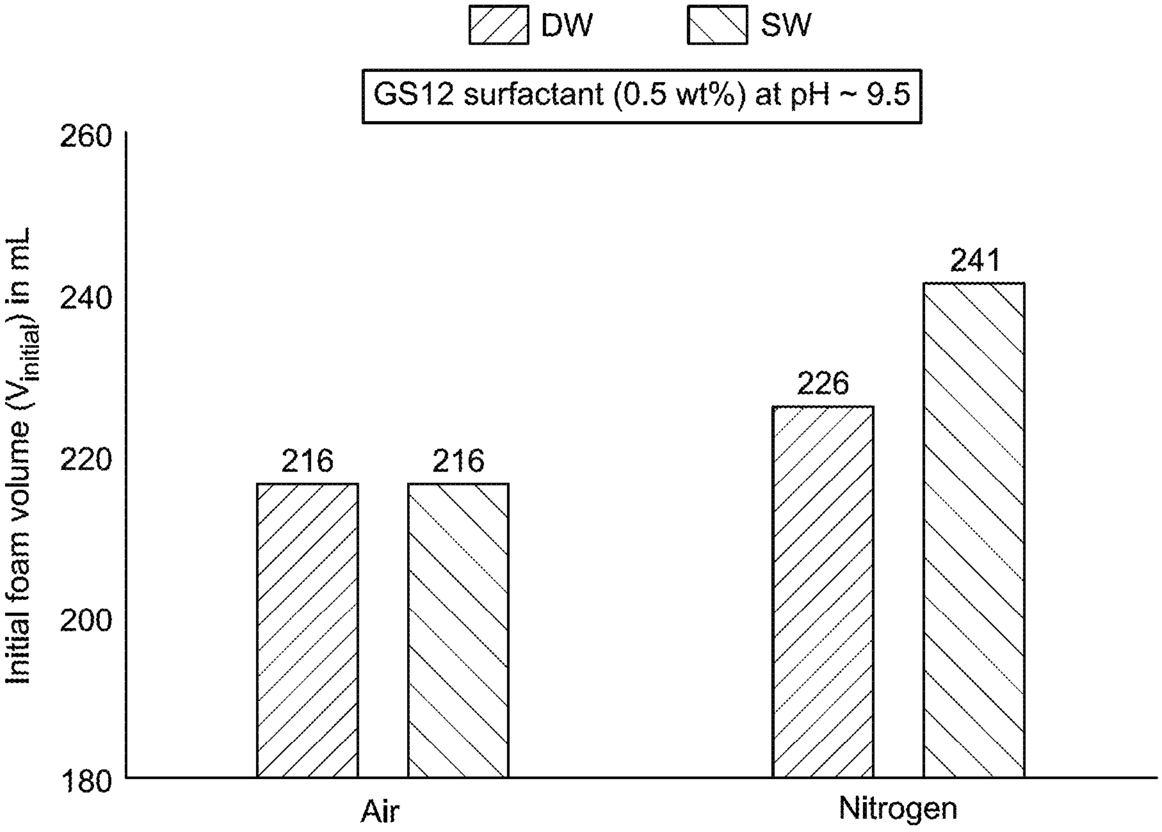
FIG. 11D shows foamability of the tested foaming solutions with gas type, according to certain embodiments.

Additionally, it is found that the foamability was affected by the gas type. Foaming using nitrogen resulted in higher foamability than air as shown in FIG. 11D. This observation can be explained as nitrogen has more capability to capture the foam due to being slightly lighter than air ($Density_{Air}$=1.29 kg/m$^3$ and $Density_{Nitrogen}$=1.25 kg/m$^3$). Foaming requires surpassing the lowest possible superficial velocity $$(U_t^{min})),$$

which is dependent upon the gas type; a denser gas necessitates a greater velocity to initiate foam generation. During the experiments, air and nitrogen were injected through the porous plate into the liquid phase at the same rate of 0.2 mL/min. As a result, the denser air generated less foam than nitrogen by 12%, requiring a higher flow rate to reach the same level of foam.

Example 11: Foam Structure

Figure 11E:
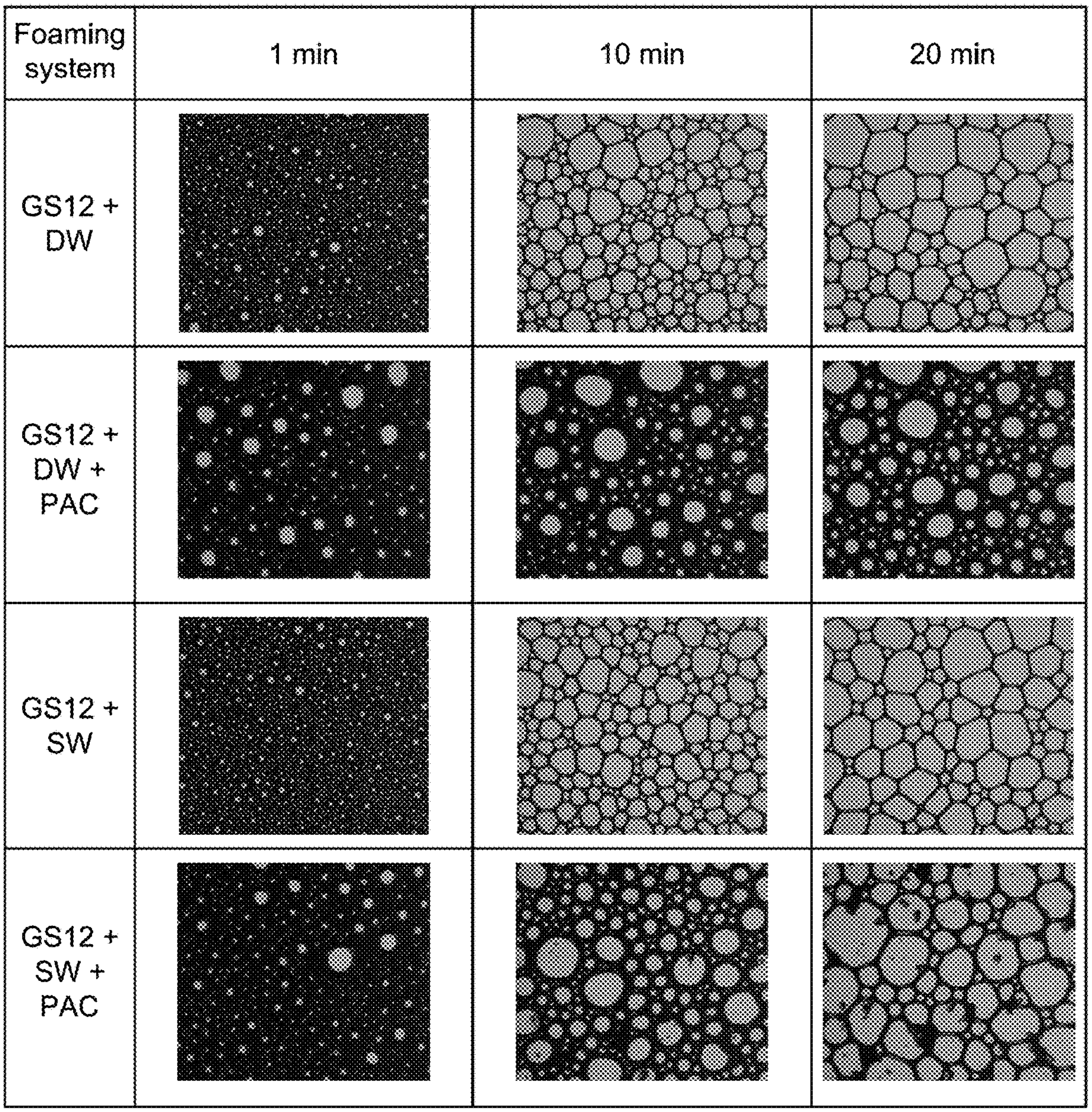
FIG. 11E shows captured images of bubble structure at different time intervals in presence of air at pH ~9.5, according to certain embodiments.
Figure 12A:
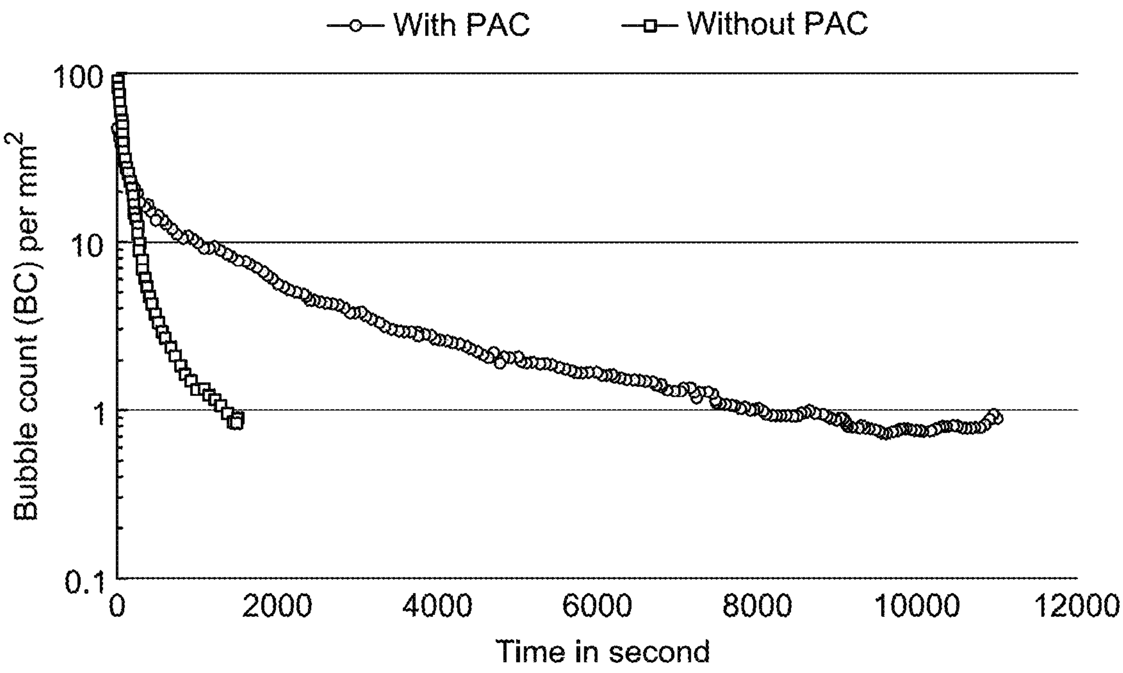
FIG. 12A shows semi-log graph for structure analysis of the foaming system in terms of bubble count per $mm^2$, using DW in the presence of air in a mildly alkaline environment, according to certain embodiments.
Figure 12B:
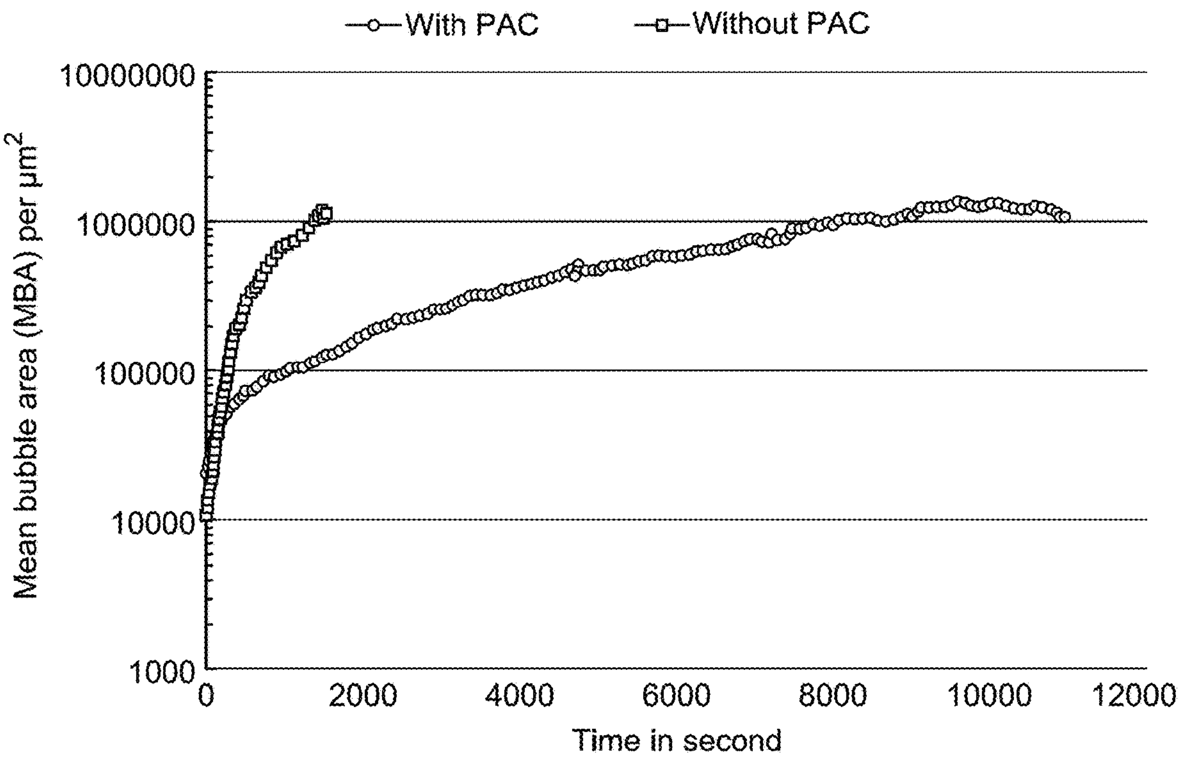
FIG. 12B shows semi-log graph for structure analysis of the foaming system in terms of mean bubble area in $\mu m^2$, using DW in the presence of air in a mildly alkaline environment, according to certain embodiments.
Figure 13A:
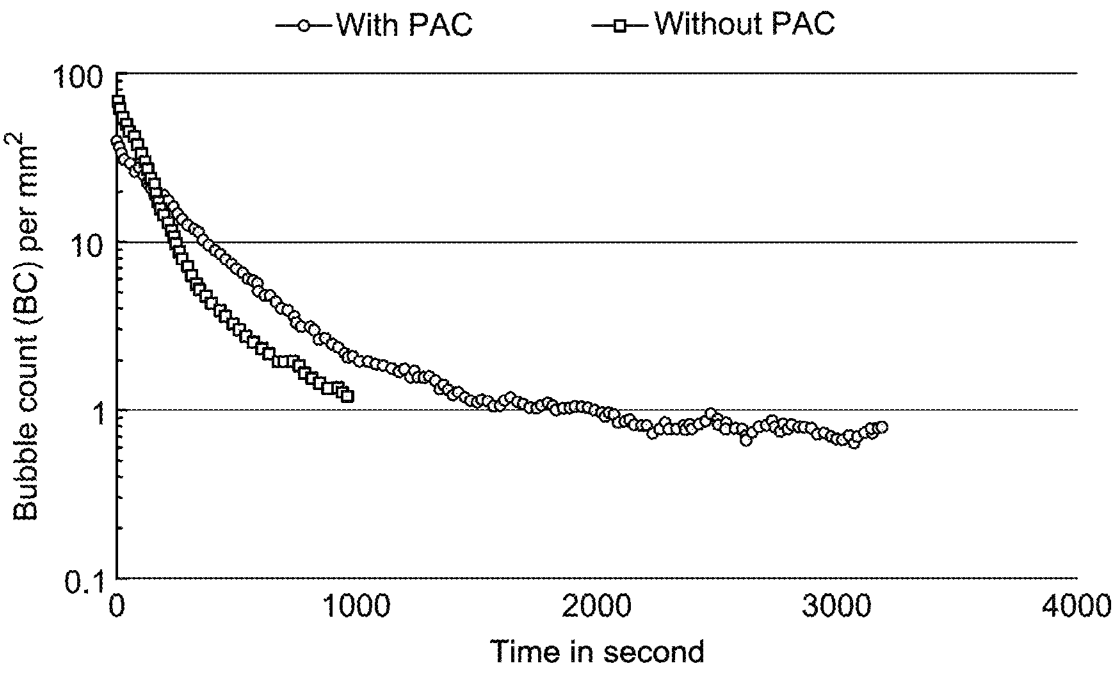
FIG. 13A shows semi-log graph for structure analysis of the foaming system in terms of bubble count per $mm^2$, using SW in the presence of air in a mildly alkaline environment, according to certain embodiments.
Figure 13B:
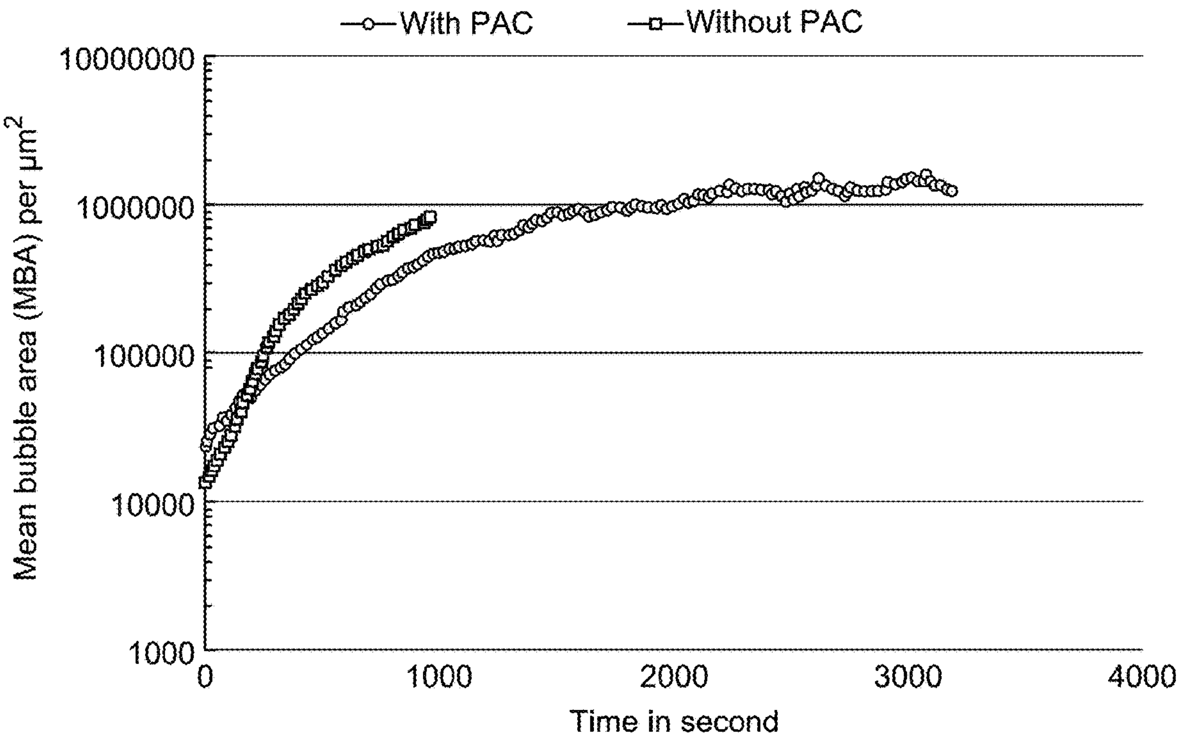
FIG. 13B shows semi-log graph for structure analysis of the foaming system in terms mean bubble area in $\mu m^2$, using SW in the presence of air in a mildly alkaline environment, according to certain embodiments.

Table 4 presents the initial bubble count ($BC_{Initial}$) of all foam systems tested in the present disclosure using GS12 surfactant immediately after foaming, which involved injecting 150 mL of gas. The bubbles were counted automatically using the high-resolution cameras of the DFA100 apparatus. The results indicate that all GS12 foams with different foaming components (except for polymer foams) had almost the same $BC_{Initial}$, spanning from 71 to 93 bubbles per mm$^2$. Thus, it was determined that the initial bubble count of GS12 foams exhibits minimal dependence on surfactant concentration, gas type, or water salinity. In contrast, adding PAC polymer resulted in stiff foam compositions characterized by a lower initial bubble count, which was approximately half the count of other foam systems. Therefore, the assessment of polymer foams constituted a focus for further investigation to gain an improved understanding of how PAC influences the structure and bubble count of GS12 foam. FIG. 11E depicts captured images of the bubble structure of GS12 with and without PAC at different time intervals in the presence of air at pH ~9.5. The results illustrate that initially, the stable foam generated fine-textured, uniform spherical bubbles with an average initial bubble radius of around 56 to 63 m and large bubble count (73 and 93 mm$^{-2}$) while using both DW and SW respectively, for different levels of salinity. As time progressed, the bubble count decreased, and the bubble size increased as the smaller bubbles combined with larger ones. The bubbles progressed from spherical to polyhedron in shape due to bubble coarsening. This happens because of the diffusion of gas through liquid films due to a pressure difference. Contrarily, the behavior of the polymer GS12 foams showed differences in bubble size and shape as they were not uniform. The present disclosure observed that the bubble count and bubble size remained constant for a long period, and bubble coarsening was not notable. When polyanionic cellulose polymer was added to the foaming solution, it acted as a stabilizer of the foam structure. This is because the polymer adsorbs onto the surface of the bubbles and creates a thin layer of stabilization, which can slow the coalescence of bubbles and maintain the overall bubble count and size. Additionally, PAC polymer can increase the viscosity of the solution, which can inhibit the drainage of liquid from the film separating the bubbles, further contributing to the stability of the foam. The polymer GS12 foams were found to have the largest bubble size (77 and 82 m) and the minimum bubble count (44 and 43 mm$^{-2}$ for the cases of DW and SW respectively) among all the tested GS12 foaming systems. This resulted in maximum stability for these foaming systems. Semi-log graphs in FIGS. 12A to 12B and FIGS. 13A to 13B illustrate the structure analysis of GS12 foaming systems in terms of bubble count per mm$^2$ and mean bubble area in mm$^2$. The experiments were conducted using DW and SW until the half-life of foam was reached and performed in the presence of air at pH ~9.5. The results are consistent with the images in FIG. 11E. The results indicated that the bubble count of stable GS12 foams (without PAC) decreased considerably over time due to bubble coarsening and coalescence, whereas polymer GS12 foams (with PAC) showed a more gradual and slow decline in bubble count (see FIG. 12A and FIG. 13A). The findings were further supported by the significant increase in the mean bubble area (MBA) per $mm^2$ of the foam bubbles for stable GS12 foams (see FIG. 12B and FIG. 13B), as evidenced by the steep gradient, compared to polymer foams, regardless of the salinity level of the base fluid.

TABLE 4

Observed foam bubble count ($BC_{Initial}$) per $mm^2$ for the GS12 surfactant immediately after the foaming has stopped.

| System Index | System Components | Varying Component | $BC_{Initial}$/ $mm^2$ |
|---|---|---|---|
| 1 | DW + 0.1% GS12 + Air | Surfactant | 72 |
| 2 | DW + 0.5% GS12 + Air | Concen- | 93 |
| 3 | DW + 1.0% GS12 + Air | tration | 80 |
| 4 | DW + 1.5% GS12 + Air | | 75 |
| 5 | DW + 2.0% GS12 + Air | | 79 |
| 6 | 25% SW + 0.5% GS12 + Air | Water | 77 |
| 7 | 50% SW + 0.5% GS12 + Air | Salinity | 88 |
| 8 | 75% SW + 0.5% GS12 + Air | | 74 |
| 9 | SW + 0.5% GS12 + Air | | 75 |
| 10 | DW + 0.5% GS12 + Nitrogen | Gas Type | 83 |
| 11 | SW + 0.5% GS12 + Nitrogen | | 71 |
| 12 | DW + 0.5% GS12 + Air + 3 g/L PAC | Adding | 44 |
| 13 | SW + 0.5% GS12 + Air + 3 g/L PAC | Polymer | 34 |

In the present disclosure, the dynamic foam analyzer (DFA 100) is used to investigate the foam stability, foamability, and bubble structure of the gemini surfactant (GS12) at ambient conditions. By evaluating the foam properties at high pH conditions imitating typical drilling environments, the present disclosure introduces GS12 surfactant as a viable foaming agent for UB foam drilling. Further, the impact of surfactant concentration, water salinity, gas type, and polymer addition on the properties of GS12 foams were considered. According to the present disclosure, in the absence of salts, an optimum surfactant concentration of 1.5 wt. % was found to maximize foam stability. Increasing GS12 concentration threefold from 0.5 wt. % to 1.5 wt. % improved stability by only 30%. Therefore, a concentration of 0.5 wt. % was determined to be sufficient for generating stable foam from an economic perspective for field UBD foam applications. The stability of GS12 foam decreases as water salinity increases, with a maximum reduction of twofold observed in seawater. The decrease in GS12 foam stability as water salinity increases can be mitigated by using polymers to improve its stability and introduce SW as a viable alternative to freshwater in underbalanced foam drilling. The initial foam volume of GS12 surfactant was found to be barely dependent on surfactant concentration, water chemistry, and polymer addition. However, the gas type affected foamability, with nitrogen producing higher foamability and more stable foam than air. The initial bubble count of GS12 foam systems was found to be minimally dependent on surfactant concentration, gas type, or water salinity. However, the addition of polymer resulted in a lower initial bubble count. Adding polyanionic cellulose (PAC) can enhance the stability of GS12 foams, leading to a more consistent bubble count and size over time.

Numerous modifications and variations of the present disclosure are possible in light of the above teachings. It is therefore to be understood that within the scope of the appended claims, the invention may be practiced otherwise than as specifically described herein.

The invention claimed is:

1. A method of underbalanced drilling, comprising:

drilling into a subterranean geological formation to form a wellbore therein;

injecting a foaming agent into the wellbore during drilling at a wellbore pressure that is below a pore pressure of the subterranean geological formation, wherein the foaming agent forms a foam in the wellbore at a drilling surface at a bottom of the wellbore; and transporting drill cuttings formed by the drilling away from the drilling surface in the foam, wherein the foaming agent is an aqueous solution comprising a gemini amphiphile dicationic surfactant having a linker and a lipophilic tail of Formula I (I)

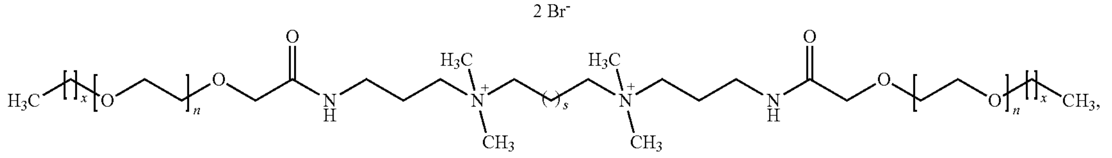

and wherein s is 10, x is 12, n is an integer from 6 to 10, wherein the gemini amphiphile is present in the foaming agent in an amount of 0.5 wt. %, wherein the foaming agent has a foam half-life of at least 15, wherein the foaming agent is an aqueous solution that further comprises deionized water and synthetic seawater, wherein a ratio of an amount of the deionized water and an amount of the synthetic seawater is 1:4 to 4:1, wherein the foaming agent has a drainage half-life ($t_{FLS50\%}$) of 91 to 96 min, and wherein the foaming agent has an initial foam volume ($V_{initial}$) of 213 to 220 mL.

2. The method of claim 1, wherein the foaming agent has a pH of 8 to 11.

3. The method of claim 1, wherein the foaming agent is an aqueous solution that further comprises a polymer selected from the group consisting of xanthan gum, guar gum, starch, and polyanionic cellulose.

4. The method of claim 1, wherein the foaming agent has a pH of 9 to 10.

5. The method of claim 1, wherein the foaming agent is an aqueous solution further comprising formation water.

6. The method of claim 1, wherein the foaming agent has a pH of 9.5.

7. The method of claim 1, wherein the foaming agent has an initial bubble count of at least 71 per $mm^2$.

8. The method of claim 1, wherein the foaming agent has an average initial bubble radius of at least 56 μm.

9. The method of claim 1, wherein the foaming agent has an average bubble area of at least 500,000 $\mu m^2$ after 2 hr.

10. The method of claim 1, wherein the foaming agent is an aqueous solution that further comprises polyanionic cellulose.

11. The method of claim 1, wherein the foaming agent has a spherical foam structure.

* * * * *